(12) United States Patent
Allan

(10) Patent No.: US 12,101,666 B2
(45) Date of Patent: Sep. 24, 2024

(54) LIGHTWEIGHT FRAGMENTATION AND RELIABILITY FOR FIXED MOBILE CONVERGENCE ACCESS STRATUM AND NON-ACCESS STRATUM SIGNALING

(71) Applicant: Telefonaktiebolaget LM Ericsson (publ), Stockholm (SE)

(72) Inventor: David Ian Allan, Victoria (CA)

(73) Assignee: Telefonaktiebolaget LM Ericsson, Stockholm (SE)

( * ) Notice: Subject to any disclaimer, the term of this patent is extended or adjusted under 35 U.S.C. 154(b) by 365 days.

(21) Appl. No.: 17/756,041

(22) PCT Filed: Jan. 10, 2020

(86) PCT No.: PCT/IB2020/050201
§ 371 (c)(1),
(2) Date: May 13, 2022

(87) PCT Pub. No.: WO2021/099845
PCT Pub. Date: May 27, 2021

(65) Prior Publication Data
US 2022/0408310 A1    Dec. 22, 2022

Related U.S. Application Data

(60) Provisional application No. 62/937,217, filed on Nov. 18, 2019.

(51) Int. Cl.
*H04L 1/00* (2006.01)
*H04L 1/1867* (2023.01)
(Continued)

(52) U.S. Cl.
CPC ......... *H04W 28/065* (2013.01); *H04L 1/0061* (2013.01); *H04L 1/188* (2013.01);
(Continued)

(58) Field of Classification Search
CPC . H04L 1/0001–248; H04L 12/46–4695; H04L 47/10–83; H04L 69/02–40;
(Continued)

(56) References Cited

U.S. PATENT DOCUMENTS

2010/0098419 A1* 4/2010 Levy .................... H04L 12/2898
2018/0242143 A1* 8/2018 Liang ..................... H04L 69/22

OTHER PUBLICATIONS

Dave Allan et al., "5G Fixed Mobile Convergence User Plane Encapsulation, draft-allan-5g-fmc-encapsulation-00," Jul. 2019, 8 pages, Internet Draft, IETF Trust and the persons identified as the document authors. (Year: 2019).*
(Continued)

*Primary Examiner* — Timothy J Weidner
(74) *Attorney, Agent, or Firm* — Nicholson De Vos Webster & Elliott LLP

(57) ABSTRACT

A method is provided to implement a fragmentation mechanism for a session between a 5G-RG and access gateway function (AGF) communicating over point to point protocol over Ethernet (PPPoE) that encapsulates control messages, where the 5G-RG or the AGF is a sender of a message. The method includes receiving the message to be sent that does not fit within a maximum transmission unit for the session, generating a first fragment of the message and a second fragment of the message, and sending the first fragment of the message and the second fragment of the message to a receiver, the second fragment including metadata with a length, and cyclic redundancy check.

20 Claims, 19 Drawing Sheets

(51) Int. Cl.
  *H04L 47/36* (2022.01)
  *H04L 47/43* (2022.01)
  *H04L 69/28* (2022.01)
  *H04L 69/324* (2022.01)
  *H04W 28/02* (2009.01)
  *H04W 28/04* (2009.01)
  *H04W 28/06* (2009.01)
  *H04W 28/12* (2009.01)
  *H04W 80/02* (2009.01)
  *H04W 84/02* (2009.01)
  *H04W 88/00* (2009.01)
  *H04W 88/16* (2009.01)
  *H04W 88/18* (2009.01)
  *H04W 92/02* (2009.01)
  *H04W 92/06* (2009.01)

(52) U.S. Cl.
  CPC .............. *H04L 47/36* (2013.01); *H04L 47/43* (2022.05); *H04L 69/28* (2013.01); *H04L 69/324* (2013.01); *H04W 28/0273* (2013.01); *H04W 28/04* (2013.01); *H04W 28/12* (2013.01); *H04L 2001/0092* (2013.01); *H04L 2212/00* (2013.01); *H04W 80/02* (2013.01); *H04W 84/02* (2013.01); *H04W 88/005* (2013.01); *H04W 88/16* (2013.01); *H04W 88/18* (2013.01); *H04W 92/02* (2013.01); *H04W 92/06* (2013.01)

(58) Field of Classification Search
  CPC ........ H04L 2212/00; H04W 4/18–185; H04W 24/02–10; H04W 28/02–26; H04W 48/02–20; H04W 76/10–50; H04W 80/02–12; H04W 84/005–22; H04W 88/005–188; H04W 92/02–24
  See application file for complete search history.

(56) References Cited

OTHER PUBLICATIONS

International Search Report and Written Opinion for Application No. PCT/IB2020/050201, dated Jul. 20, 2020, 12 pages.
Dave Allan et al., "5G Fixed Mobile Convergence User Plane Encapsulation, draft-allan-5g-fmc-encapsulation-00," Jul. 2019, 8 pages, Internet Draft, IETF Trust and the persons identified as the document authors.
W. Simpson, "The Point-to-Point Protocol (PPP)," Jul. 1994, 54 pages, Network Working Group, RFC 1661.
L. Mamakos et al., "A Method for Transmitting PPP Over Ethernet (PPPoE)," Feb. 1999, 17 pages, Network Working Group, RFC 2516, The Internet Society.
J. Carlson et al., "Point-to-Point Protocol (PPP) Vendor Protocol," May 2004, 10 pages, Network Working Group, RFC 3772, The Internet Society.
3GPP TS 23.316 V16.1.0, "3rd Generation Partnership Project; Technical Specification Group Services and System Aspects; Wireless and wireline convergence access support for the 5G System (5GS) (Release 16)," Sep. 2019, 75 pages, 3GPP Organizational Partners.

* cited by examiner

LIGHTWEIGHT FRAGMENTATION AND RELIABILITY FOR FIXED MOBILE CONVERGENCE ACCESS STRATUM AND NON-ACCESS STRATUM SIGNALING

CROSS-REFERENCE TO RELATED APPLICATIONS

This application is a National stage of International Application No. PCT/IB2020/050201, filed Jan. 10, 2020, which claims the benefit of U.S. Provisional Application No. 62/937,217, filed Nov. 18, 2019, which are all hereby incorporated by reference.

TECHNICAL FIELD

Embodiments of the invention relate to the field of fixed mobile convergence; and more specifically, to a process for managing fragmentation related to access stratum and non-access stratum signaling.

BACKGROUND ART 5G provides a new avenue for providing fixed access to broadband in a residential context. This utilization of 5G is referred to as fixed mobile convergence. In this context, residential broadband served by a 5G System can be provided to any number of user devices including mobile handsets, computers, tablets, and other computing devices that connect to a residential gateway or similar customer premise equipment. The residential gateway then may connect with the 5G network via wireline access facilities such as a passive optical network (PON) or digital subscriber line (DSL) in addition to the possibility of fixed wireless access (FWA) and combinations of these access technologies.

The deployment of 5G wireline access typically will involve an intervening Ethernet based legacy access network often based upon the Broadband Forum TR-101 and related specifications. This will be for the purposes of meeting wholesale or regulatory requirements and differs from the radio architecture where traffic is adapted onto 5G at a radio base station of a cellular network with no intervening network. Converged 5G wireline access to the 5G System carries user data between 5G residential gateways (5G-RG) and a 5G Access Gateway Function (i.e., a fixed network (F)-AGF) across deployed access networks. The transport encapsulation used between the 5G-RG and the F-AGF needs to meet a variety of requirements including the ability to transport both access stratum (AS) and non-access stratum (NAS) control traffic within a virtual local area network (VLAN) identified point to point (p2p) logical circuit between a 5G-RG and an F-AGF. Life cycle management of PDU sessions is performed via 5G control plane interactions between the user equipment (in the wireline case at a 5G-RG) and the 5G Core.

Point to point protocol (PPP) over Ethernet (PPPoE) is a protocol commonly used in wireline networks and has been deployed for some 20 years. PPPoE provides mechanisms for session multiplexing and employs a hierarchy of protocols (link control protocol (LCP), network control protocol (NCP) and similar protocols.) to perform session lifecycle management via user plane transactions. PPPoE is typically transported over a provisioned and VLAN delineated access circuit. PPPoE has been selected as the preferred transport for 5G control traffic between a 5G-RG and an F-AGF. The PPP suite of protocols includes a vendor specific network protocol (VSNP), which the Broadband Forum has selected as the underlying encapsulation for NAS and AS traffic.

The VSNP, PPP, PPPoE stack imposes a small amount of protocol overhead which reduces the maximum transmission unit (MTU) for a single VNSP protocol data unit (PDU) to a value slightly less that the Ethernet 1500 byte MTU. The exact amount is indeterminate at the time of writing due to incomplete design work in standardization. NAS and AS traffic are carried over the VNSP. A NAS message may not have a theoretical length restriction. As a practical matter, a NAS message can be restricted by radio resource control (RRC) used as a transport over radio interfaces which has an MTU of 8188 bytes. Thus, NAS messages create a problem with compatibility with VSNP and PPPoE as a simple encapsulation due to the potential for NAS messages to be longer than the available MTU.

SUMMARY

In one embodiment, a method is provided to implement a fragmentation mechanism for a session between a 5G-RG and access gateway function (AGF) communicating over point to point protocol over Ethernet (PPPoE) that encapsulates control messages, where the 5G-RG or the AGF is a sender of a message. The method includes receiving the message to be sent that does not fit within a maximum transmission unit for the session, generating a first fragment of the message and a second fragment of the message, and sending the first fragment of the message and the second fragment of the message to a receiver, the second fragment including metadata containing a message length, and a cyclic redundancy check.

In another embodiment, a method is provided to implement a fragmentation mechanism for a session between a 5G-RG and AGF communicating over PPPoE that encapsulates control message, where the 5G-RG or the AGF is a receiver of a message. The method includes receiving a first fragment and a second fragment of the message from a sender, determining whether the second fragment is an end fragment, the end fragment including metadata containing a message length, and cyclic redundancy check, checking the message number, checking the metadata length against the first fragment and second fragment, validating the cyclic redundancy check, and extracting the message from the first fragment and second fragment, in response to the message length, and cyclic redundancy check being correct.

In one embodiment, a computing device can implement a method of a fragmentation mechanism for a session between a 5G-RG and AGF communicating over PPPoE that encapsulates control messages, where the 5G-RG or the AGF is a sender of a message. The computing device includes a non-transitory machine readable medium having stored therein the fragmentation mechanism, and a processor coupled to the non-transitory machine readable medium. The processor can execute the fragmentation mechanism. The fragmentation mechanism can receive the message to be sent that does not fit within a maximum transmission unit for the session, generate a first fragment of the message and a second fragment of the message, and send the first fragment of the message and the second fragment of the message to a receiver, the second fragment including a length of the message, and a cyclic redundancy check.

In a further embodiment, a computing device can implement a method of a fragmentation mechanism for a session between a 5G-RG and AGF communicating over PPPoE that encapsulates control messages, where the 5G-RG or the AGF is a receiver of a message. The computing device includes a non-transitory machine readable medium having stored therein the fragmentation mechanism, and a processor coupled to the non-transitory machine readable medium. The processor can execute the fragmentation mechanism. The fragmentation mechanism can receive a first fragment and a second fragment of the message from a sender, determine whether the second fragment is an end fragment, the end fragment including metadata containing a message length, and a cyclic redundancy check, check the message number, check the message length against the first fragment and second fragment, validate the cyclic redundancy check, and extract the message from the first fragment and second fragment, in response to the message number, and cyclic redundancy check being correct.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
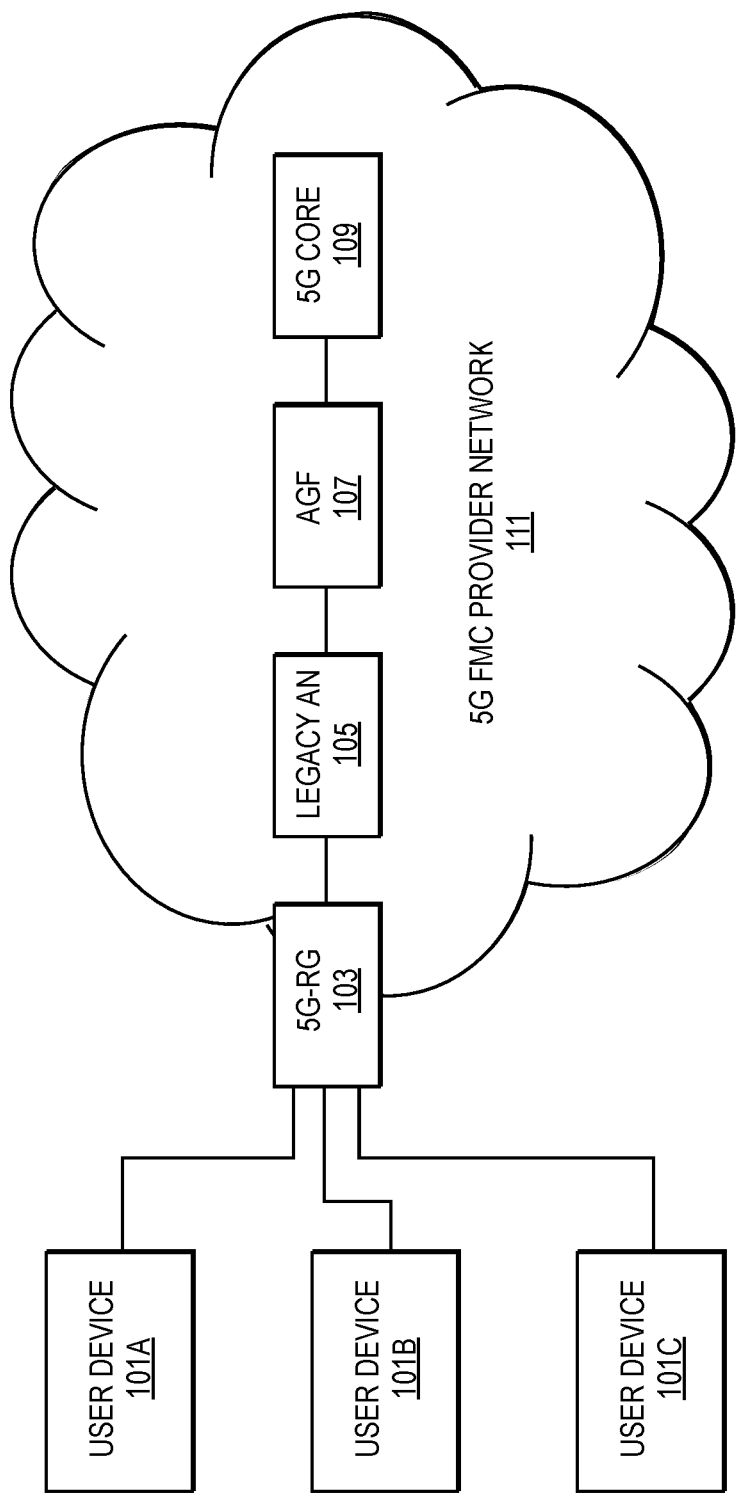
FIG. 1 is a diagram of one embodiment of a network implementing fixed mobile convergence.

The following description describes methods and apparatus for a fragmentation management process to support access stratum (AS) and non-access stratum (NAS) traffic over point to point protocol over Ethernet (PPPoE) and vendor specific network protocol (VNSP) in a fixed mobile convergence (FMC) scenario between a 5G residential gateway (5G-RG) and an Access Gateway Function (AGF). In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Overview

As part of providing wireline access to the 5G core for residences, deployed wireline networks carry user data and control traffic between 5G residential gateways (5G-RG) and the 5G Access Gateway Function (AGF). The traffic between the 5G-RG and AGF is encapsulated to traverse the intermediate network devices along a data path. The encapsulation used between the 5G-RG and the AGF needs to meet a variety of requirements including being able to carry AS and NAS traffic over VNSP where a NAS or AS message may exceed the MTU of the 5G-RG-AGF interface. The embodiments provide a fragmentation management mechanism implemented at the 5G-RG and AGF to allow reliable fragmentation and reassembly of AS and NAS traffic.

FIG. 1 is a diagram of one embodiment of a network implementing fixed mobile convergence including support for the fragmentation management embodiments. A provider network 111, such as a converged 5G ("fifth generation") wireline network provides broadband Internet access to residences via a combination of cellular and wired technology. In one embodiment, the provider network 111 carries user data and control traffic between 5G-RGs the 5G AGF across both wired and wireless connections (e.g., over deployed TR-101 and TR 178 access networks).

A residential network consists of a set of user devices 101A-C connected to the 5G-RG via wired and wireless access technologies (e.g., Ethernet, WiFi and similar technology). Any number of user devices 101A-C can be connected to a 5G-RG 103. The 5G-RG 103 connects the residence to the functions of the provider network 111 and services of the wider Internet via the 5G core (5GC) network 109. Communication within the residence and between the user devices 101A-C and the 5G-RG 103 is based on local area network technologies, in particular Ethernet. Communication between some classes or groups of home user devices and the 5G core may be via different PDU sessions possibly supporting different network slices, and one of the roles of the 5G-RG is to map home user devices to the appropriate PDU sessions and vice versa.

Many of the functions of mapping access onto the 5G Core 109 are provided by the AGF 107. The communication between the 5G-RG 103 and the AGF 107 utilizes a transport encapsulation for the control traffic that performs lifecycle management for PDU sessions that needs to meet a variety of requirements. The requirements of the transport encapsulation include the ability to manage NAS and AS traffic fragmentation within a virtual local area network (VLAN) identified point to point (p2p) logical circuit between the 5G-RG and the AGF. The transport encapsulation also must allow unmodified legacy equipment in the data path (e.g., the legacy access node (AN) 105) to identify the encapsulation and snoop (i.e., access) specific fields in the payload. Some access nodes in the data path between the 5G-RG and the AGF (e.g., Digital Subscriber Loop Access Multiplexers (DSLAMs) and optical line terminators (OLTs)) currently inspect packets identified by specific Ethertypes to identify protocols such as PPPoE, Internet Protocol (IP), address resolution protocol (ARP), and Internet Group Management Protocol (IGMP). The inspection of packets by the legacy network devices may be for the purpose of enhanced QoS management, policing of identifiers, and other applications. The operation of some provider networks 111 are dependent upon this type of packet inspection. The legacy network devices are currently able to do packet inspection for PPPoE or IPoE packet encodings but would be unable to do so if a new type of encapsulation, or an existing encapsulation using a new Ethertype, were used.

The embodiments provide a fragmentation management mechanism that is compatible with PPPoE that meets these requirements. The embodiments also take into consideration that fixed access is very sensitive to the complexity of residential gateways (e.g., the 5G-RGs), therefore, the fragmentation mechanism involves low overhead and does not negatively impact efficiency.

The embodiments support defining how NAS and AS information is transported between a 5G-RG and an AGF in the FMC architecture. In particular, the embodiments support the use of PPP/PPPoE as the underlying network encapsulation and protocol. The embodiments utilize a finite state machine (FSM) on top of vendor specific network control protocol (VSNCP)/VSNP to transport NAS and AS protocol data units (PDUs). Using VSNCP/VSNP avoids requiring an IP stack for a P2P application, and the heavyweight state that IP reliability (transmission control protocol (TCP)/stream control transmission protocol (SCTP)) brings to the table. Other equivalent protocols can also be utilized with VSNCP/VSNP being utilized herein by way of example and not limitation.

The embodiments overcome problems of the prior art. The fragmentation management process and system enables the handling of NAS traffic with requirements that messages of significant length may occur. In theory there is no maximum unit size for NAS, in practice the limit is imposed by SCTP/RRC which limits a NAS message to 8188 bytes. The signaling MTU net of VSNP/PPP/PPPoE overhead may be approximately 1492 bytes. This means the embodiments of a fragmentation mechanism will be needed for compatibility. The embodiments are lightweight relative to the alternative of using an IP stack for fragmentation management. The embodiments are scalable for NAS/AS at an AGF controller.

Without a fragmentation mechanism, the reliability requirements of control plane exchange would normally be left to the application layer. NAS traffic can normally be considered to be reliable as there are timers, message retires and similar mechanisms at the NAS application layer specified for the exchange of NAS messages between the 5G-RG and the 5G System. AS messages would require similar application level reliability mechanisms but over a different span; NAS traffic is between the 5G_RG and the 5G Core, while AS traffic has a narrower scope of communication with communication being between the AGF and the 5G-RG. The provision of a fragmentation mechanism changes the reliability requirements as an application layer acknowledgement discipline cannot handle the new modes of failure introduced by the possibility of the loss of individual message fragments.

Figure 2:
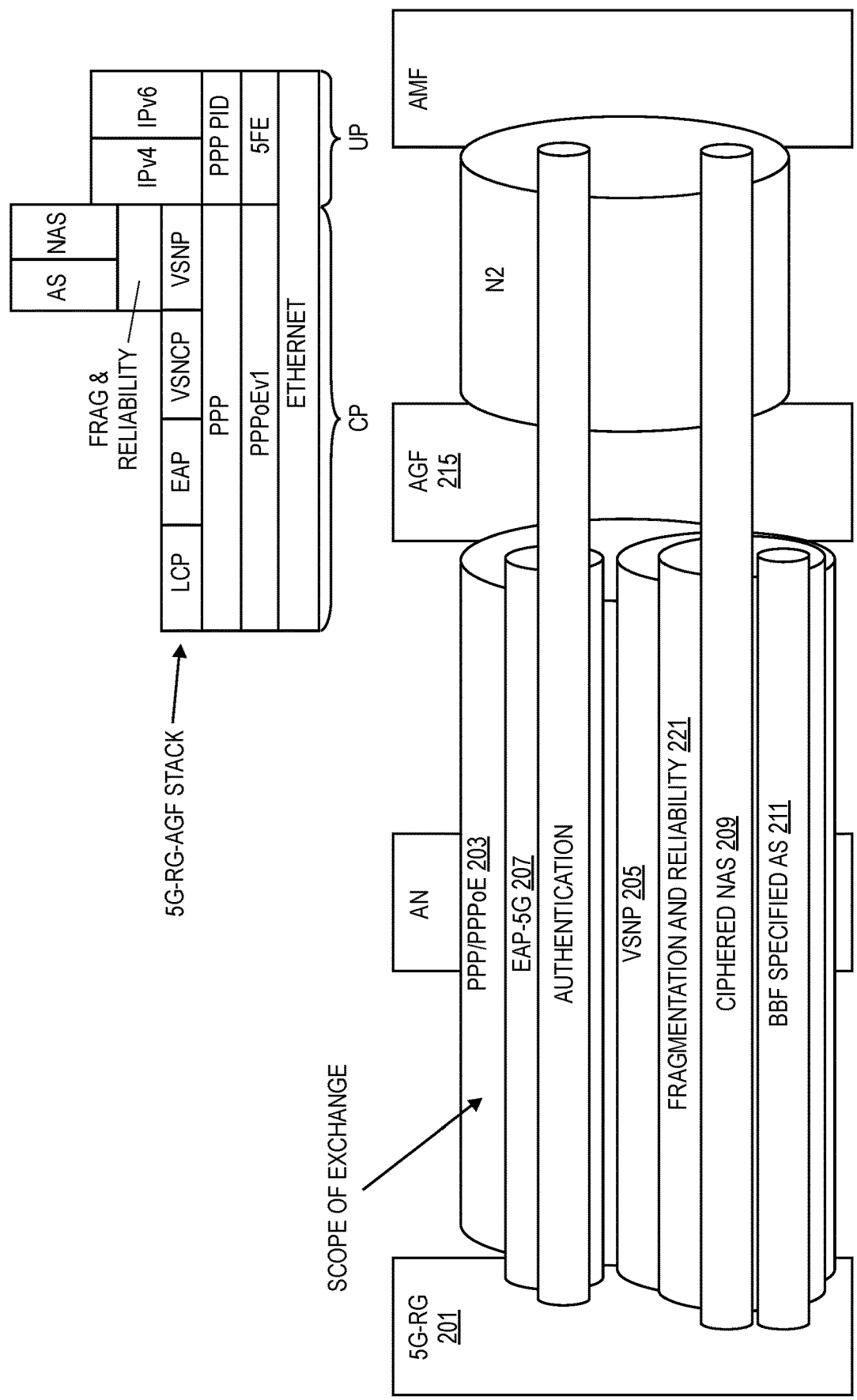
FIG. 2 is a diagram of one example illustration of the communication model between the 5G-RG and the AGF incorporating a fragmentation management mechanism.

FIG. 2 is a diagram of one example illustration of the communication model between the 5G-RG and the AGF incorporating a fragmentation management mechanism. The model illustrates message encapsulation and the 5G-RG-AGF stack. The control plane communication between the 5G-RG 201 and the AGF 215 in an FMC network is encapsulated by PPP/PPPoE 203. The PPP/PPPoE 2103 encapsulates two streams including extensible authentication protocol for 5G (EAP-5G) 207 and VSNP 205. The EAP-5G stream is utilized for session authentication. The VSNP 205 stream is utilized for transporting NAS (which is ciphered) and AS traffic, where NAS is specified by 3GPP and AS will be specified by the BroadBand Forum (BBF). The fragmentation and reliability layer 221 supports the embodiments of the fragmentation mechanism process and system. The illustrated scope of exchange relates to the control plane communication between the 5G-RG 201 and the AGF 215. As shown, user plane communication can be passed on IPv4 or IPv6, PPP, 5FE, and Ethernet.

The 5G-RG 201 and AGF 215 implement FSMs to implement the fragmentation and reliability layer 221. The MTU between the 5G-RG and the AGF is known. Intermediate nodes, e.g., access nodes (ANs), relay the PPP/PPPoE encapsulated traffic and are not affected by or have to directly support the fragmentation and reliability layer 221. The operation of the fragmentation mechanism process and system at the 5G-RG 201 and AGF 215 is described further with relation to FIGS. 3, 4, and 5 where the 5G-RG 201 and AGF 215 each implement a sender FSM and a receiver FSM for each control plane PPP/PPPoE session.

Figure 3A:
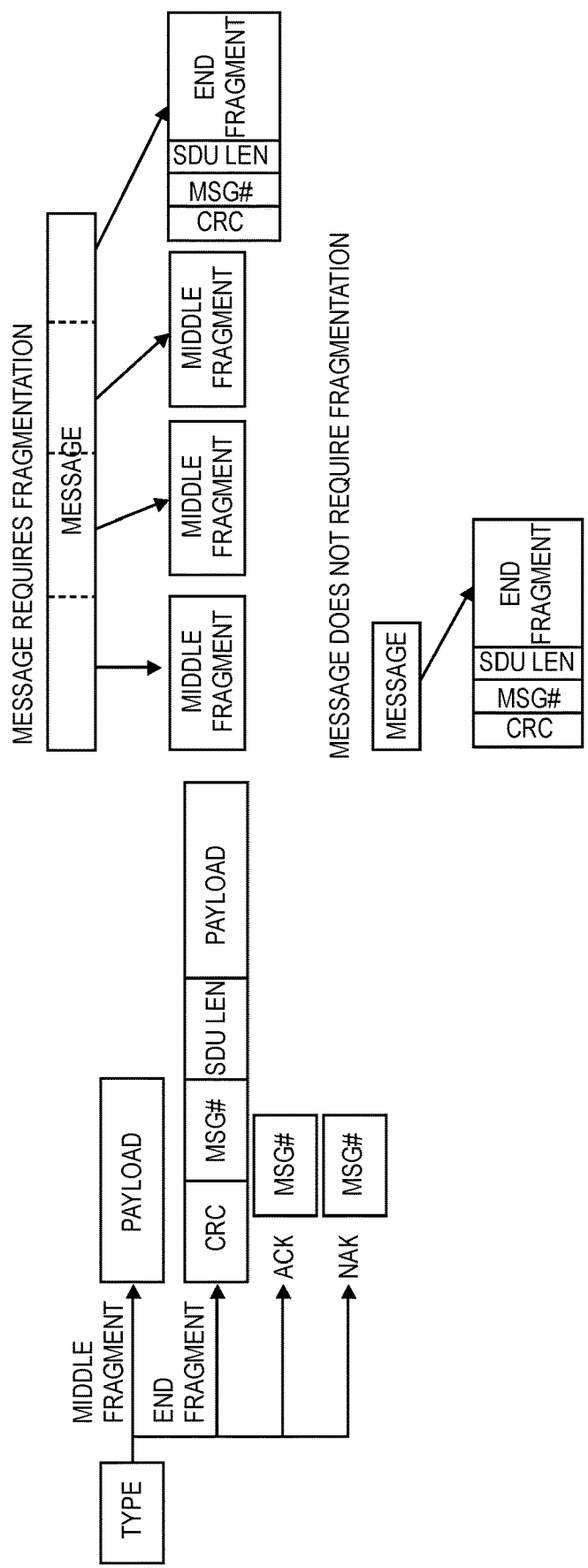
FIG. 3A is a diagram of one embodiment of a message fragmentation format.

FIG. 3A is a diagram of one embodiment of a message fragmentation format. The diagram illustrates that the fragmentation format can have four message types a middle fragment, end fragment, acknowledgement (ACK), and negative acknowledgement (NAK). A message can be referred to as a service data unit (SDU) and the terms are used interchangeably herein. The middle fragment type carries mainly a payload. The end fragment type includes SDU level metadata in the form of a length field (LEN) (e.g., an SDU length), message or SDU number (MSG #/SDU #), cyclic redundancy check (CRC), as well as payload. The metadata is located in a fixed location at the start of an end fragment and provides sufficient information to validate successful receipt of all message/SDU fragments and reassembly of the message/SDU with all fragments in the correct order. The acknowledgement and negative acknowledgement messages/SDUs also include message/SDU numbers in order to disambiguate any race conditions that might occur in protocol exchange. A long message/SDU is broken up into multiple middle fragments and one end fragment. A message/SDU that fits in a single fragment is transmitted with a single end fragment. If a message/SDU cannot fit into an end fragment with room for the overhead (i.e., the CRC, length, and message/SDU number), then it is sent as two messages/SDUs, a middle fragment and an end fragment.

Figure 3B:
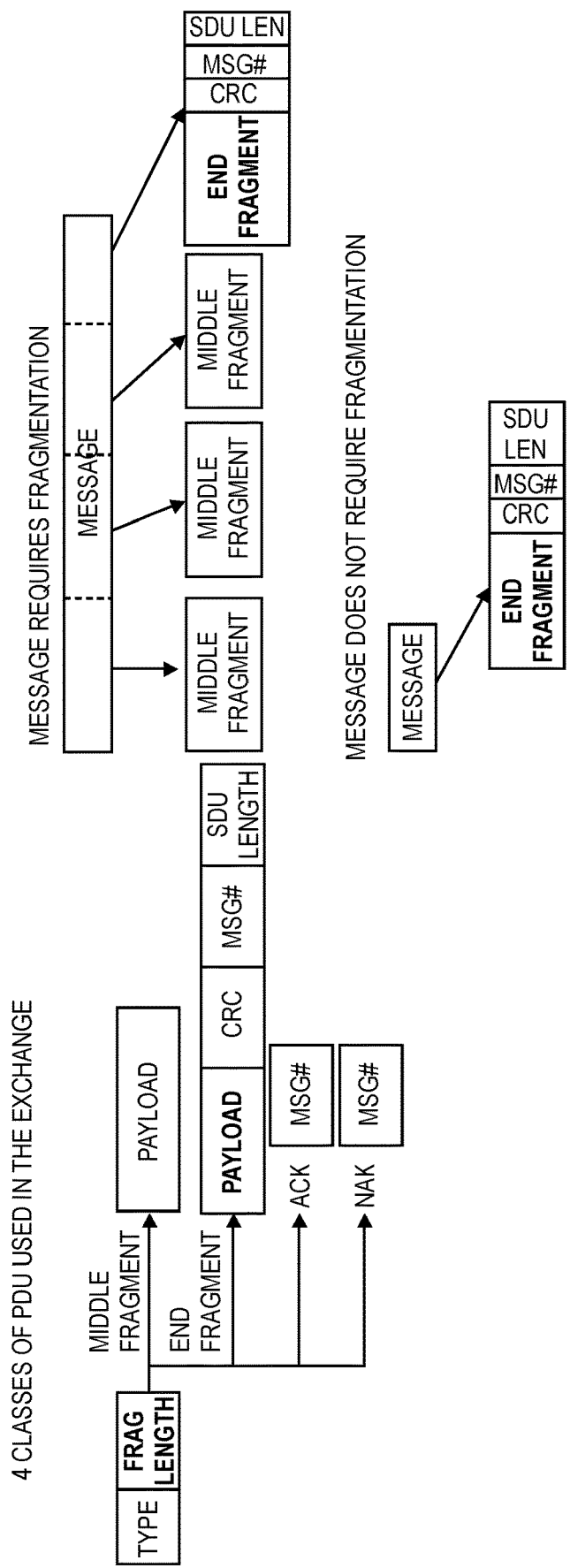
FIG. 3B is a diagram of another embodiment of a message fragmentation format.

FIG. 3B is a diagram of another embodiment of a message fragmentation format. The diagram illustrates that the alternate fragmentation format can have four message types a middle fragment, end fragment, acknowledgement (ACK), and negative acknowledgement (NAK). This embodiment provides further flexibility in fragment sizes. The middle fragment type carries mainly a payload. The end fragment type includes a payload as well as message/SDU level metadata. The message/SDU level metadata can include a cyclic redundancy check (CRC), message/SDU number (MSG #/SDU #), and a length field (LEN) (e.g., SDU length (SDU LEN). The metadata is located at the end of an end fragment and provides sufficient information to validate successful receipt of all message/SDU fragments and reassembly of the message/SDU with all fragments in the correct order. The fragment or SDU length information permits meta data to be located in an end fragment and 'short' middle fragments to be identified. The acknowledgement and negative acknowledgement messages also include message or SDU numbers in order to disambiguate any race conditions that might occur in protocol exchange. A long message is broken up into multiple middle fragments and one end fragment. A message that fits in a single fragment is transmitted with a single end fragment. If a message cannot fit into an end fragment with room for the overhead (i.e., the CRC, SDU LEN, and SDU number), then it is sent as two messages, a middle fragment and an end fragment.

Figure 3C:
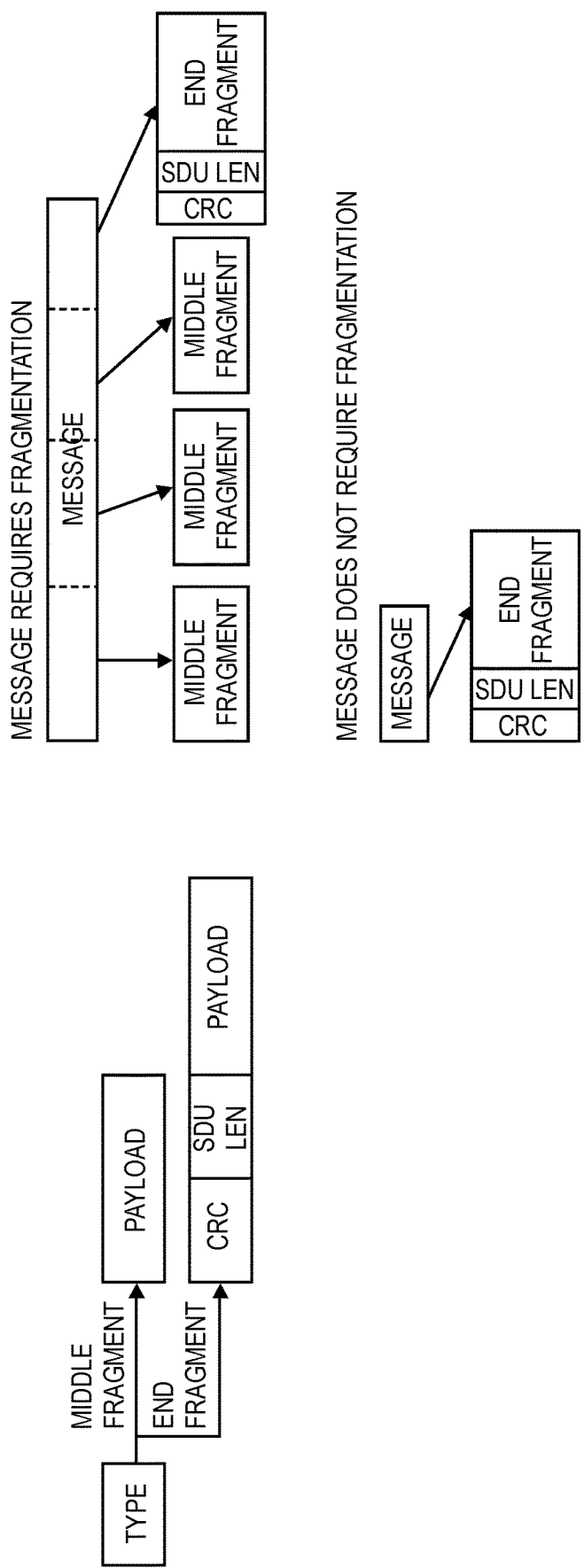
FIG. 3C is a diagram of a further embodiment of a lighter message fragmentation format.

FIG. 3C is a diagram of a further embodiment of a lighter message fragmentation format. This format is part of a process with lighter weight where the lighter fragmentation mechanism employs less messaging than other embodiments. The lighter fragmentation mechanism reduces the overhead by relying on an application layer acknowledgement discipline for reliability. In this embodiment, receiving a message that does not pass a reassembly test results in a message discard. NAS has timeouts and acknowledgements that can handle duplicate detection. AS can tolerate duplicate information and is required to implement timeouts and acknowledgement messages (which were required for application layer error reporting independent of communication reliability). By reducing the reliability process in the lighter fragmentation mechanism less overhead is required to manage acknowledgement and negative acknowledgment information.

Returning to FIG. 3C, the diagram illustrates that the lighter fragmentation format can have two message types a middle fragment, and end fragment. This embodiment provides reduced overhead with fewer message types and correspondingly reduced message exchange. The middle fragment type carries mainly a payload. The end fragment type includes a payload as well as message/SDU level metadata. The message/SDU level metadata can include a cyclic redundancy check (CRC), and a length field (LEN) (e.g., SDU length (SDN LEN). The metadata is located at the beginning of an end fragment and provides sufficient information to validate successful receipt of all message/SDU fragments and reassembly of the message/SDU with all fragments in the correct order. The end fragment can also include a payload portion. A long message is broken up into multiple middle fragments and one end fragment. A message that fits in a single fragment is transmitted with a single end fragment. If a message cannot fit into an end fragment with room for the overhead (i.e., the CRC, and SDU LEN), then it is sent as two messages, a middle fragment and an end fragment.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 4A:
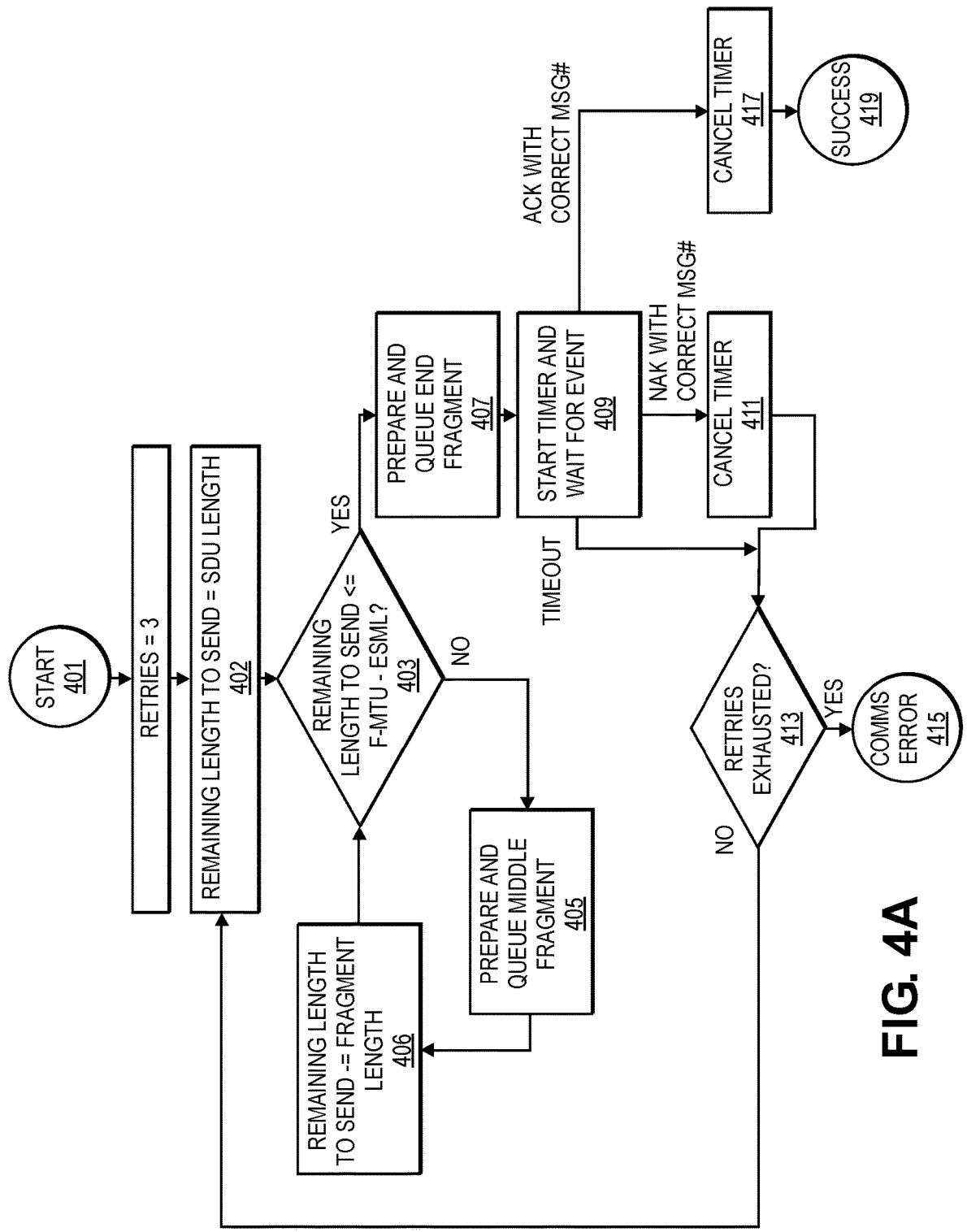
FIG. 4A is a flowchart of one embodiment of the sender finite state machine for implementing the fragmentation mechanism.

FIG. 4A is a flowchart of one embodiment of the sender finite state machine for implementing the fragment mechanism. The process of sending NAS or AS data can be initiated in response to a NAS or AS message being queued for transmission at the sending node (i.e., either the 5G-RG or the AFG) (Block 401). The start of the process can initialize a number of retries that are permitted, e.g. 3 retries. In addition, the process can initialize a tracking variable 'remaining length to send' to be equal to the message size or SDU length (Block 402). The process examines the amount of data remaining to be sent to determine whether the fragment MTU is smaller or equal to the size of an end segment payload size, referred to as an end segment metadata length (ESML) (Block 403). If the data to be sent does not fit in an end segment, then the process prepares and queues middle fragments until the remaining data fits in an end fragment to be sent to the receiver node (Block 405). With each middle fragment sent, the remaining length to send is reduced by the size of the payload or fragment sent in the middle fragment (Block 406).

When the remaining data to be sent does fit within an end fragment, then the process prepares and queues an end fragment to be sent to the receiving node (Block 407). As the end fragment is sent, the process starts a timer and waits for an event (Block 409). If no event occurs before the expiration of the timeout, then a check is made whether a number of retries has been exhausted (Block 413). If the number of retries has been exhausted, then the process returns an error (e.g., a communication error). If the number of retries has not been exhausted, then the process checks the message size again (Block 403) to restart a fragment retransmission (Block 405 and/or 407) and decrements the number of remaining retries.

If a negative acknowledgement with the correct message/SDU number is received, then the timer is canceled (Block 411), a check of the number of retries is made (Block 413) and either an error generated (Block 415) or a retransmission is started. Retransmission can entirely restart the transmission of the data to be sent. If an acknowledgement with the correct message/SDU number is received, then the timer is canceled (Block 417) and the fragmentation and transmission process has completed successfully (Block 419).

Figure 4B:
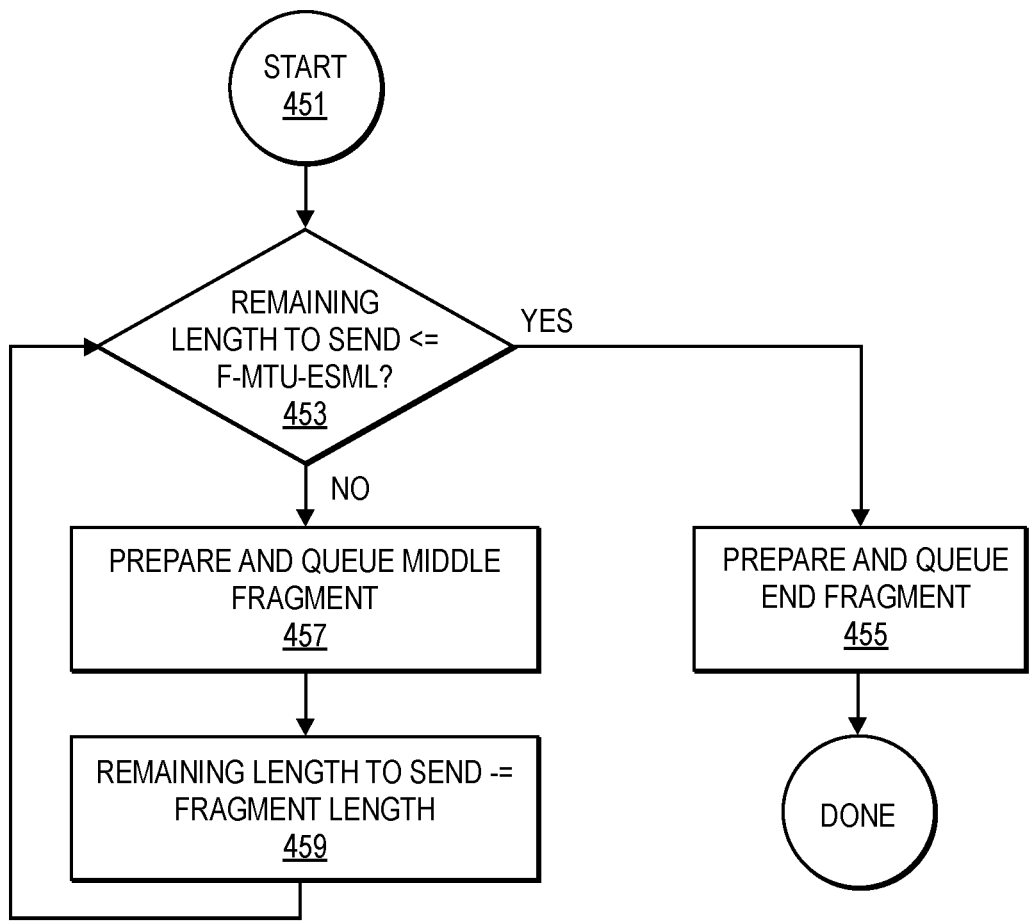
FIG. 4B is a flowchart of one embodiment of another sender finite state machine for implementing a lighter fragmentation mechanism.

FIG. 4B is a flowchart of one embodiment of another sender finite state machine for implementing a lighter fragmentation mechanism. This process of sending NAS or AS data can be initiated in response to a NAS or AS message being queued for transmission at the sending node (i.e., either the 5G-RG or the AFG) (Block 401). The start of the process can initialize a tracking variable 'remaining length to send' to be equal to the message size or SDU length. The process examines the amount of data remaining to be sent to determine whether the fragment MTU is smaller or equal to the size of an end segment payload size, referred to as an end segment metadata length (ESML) (Block 453). If the data to be sent does not fit in an end segment, then the process prepares and queues middle fragments until the remaining data fits in an end fragment to be sent to the receiver node (Block 457). With each middle fragment sent, the remaining length to send is reduced by the size of the payload or fragment sent in the middle fragment (Block 459).

When the remaining data to be sent does fit within an end fragment, then the process prepares and queues an end fragment to be sent to the receiving node (Block 455).

Figure 5A:
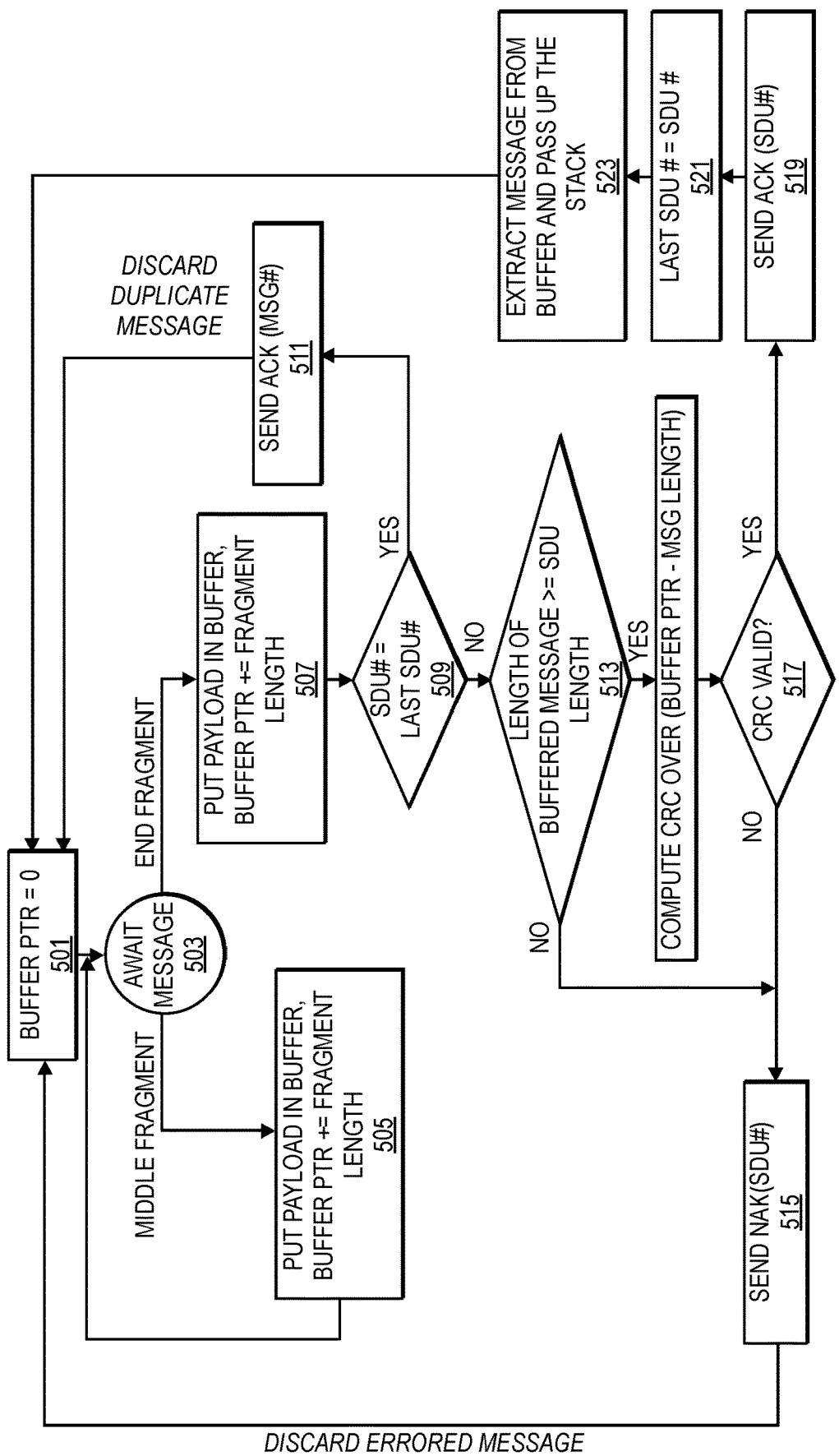
FIG. 5A is a flowchart of one embodiment of the receiver finite state machine for implementing the fragment mechanism.

FIG. 5A is a flowchart of one embodiment of the receiver finite state machine for implementing the fragment mechanism. The process of receiving NAS or AS data can be initiated in response to receiving data from the sender. This received data can be stored in a buffer to be processed. In some embodiments, a buffer pointer is used that is initialized to a starting point (e.g., setting the pointer to position 0). The receiver awaits the receipt of fragments from the sender (Block 503). When a middle fragment is received, the payload of the fragment is stored in the buffer and the buffer pointer is increased an amount equivalent to the length of the received fragment (Block 505). The process then continues to await further fragments (Block 503).

When an end fragment is received, the buffer pointer is increased based on the length of the fragment and the payload is stored in the buffer (Block 507). A check is then made to compare the message/SDU number of the received message with an expected message/SDU number (Block 509). The expected message/SDU number can be the next number in a sequence (with wrapping of the value known to those skilled in the art) or if this is the first message received since a receiver initialization, the expected number will be marked as unknown and any received value will be accepted, or if the sender and receiver have lost synchronization it can be a value other than the last received message/SDU number, or the next expected message in the sequence.

If the message/SDU number indicates that the message/SDU is a duplicate; indicated by the message/SDU number being equal to the message number of the last message acknowledged, then the receiver sends an acknowledgement message including the metadata message/SDU number (Block 511) and the message is discarded. Any further duplicate messages that have been received, which are identified by duplicate message/SDU numbers, can be discarded after acknowledgement. The process then resets the buffer pointer and awaits a next message (Blocks 501 and 503).

If the message/SDU number in the metadata is the expected message/SDU number or an unexpected value (indicating the sender and receiver had lost message synchronization) or the expected message/SDU number was unknown, then the metadata message/SDU length is checked against the length of data in the buffer (Block 513). If the length of the data in the buffer is not greater than or equal to the message/SDU length of the received message, then a message fragment has been lost and the process sends a negative acknowledgement (NAK) with a message/SDU number (Block 515). This causes the message to be discarded, the buffer reset, and the process to expect a retransmission of the message. If the message/SDU length in the buffer is greater than or equal to the expected message/SDU length, then the process computes the CRC over the message in the buffer (e.g., the data in the buffer at the positions between the buffer pointer and the buffer pointer minus the metadata message/SDU length (Block 517)). If the CRC is not valid, it is assumed a fragment has been lost or out of order receipt has occurred, and a negative acknowledgement with the message/SDU number is sent (Block 515). This causes the message to be discarded, the buffer reset, and the process to expect a retransmission of the message.

If the CRC is valid, then the message has been validated as being reassembled correctly and an acknowledgement message is sent to the sender node (Block 519). The acknowledgement includes the message number obtained from the message metadata. The last message/SDU number is then set to the message/SDU number (Block 521). The message is extracted from the buffer and passed up the stack (Block 523). The buffer pointer is reset and the process awaits a next message.

In one embodiment, the CRC is computed using the (AAL5) algorithm or similar algorithm. The CRC value can be a 32 bit value (e.g., a polynomial specified by section 9.2.1.2 of International Telecommunication Union (ITU) recommendation I.363. The length field can be 16 bits. The message #/SDU # can be 8 bits. The message #/SDU # values can wrap from 1-255 and a 0 can be a reserved value. In some embodiments, an octet is reserved to pad the metadata to a 32 bit boundary.

Figure 5B:
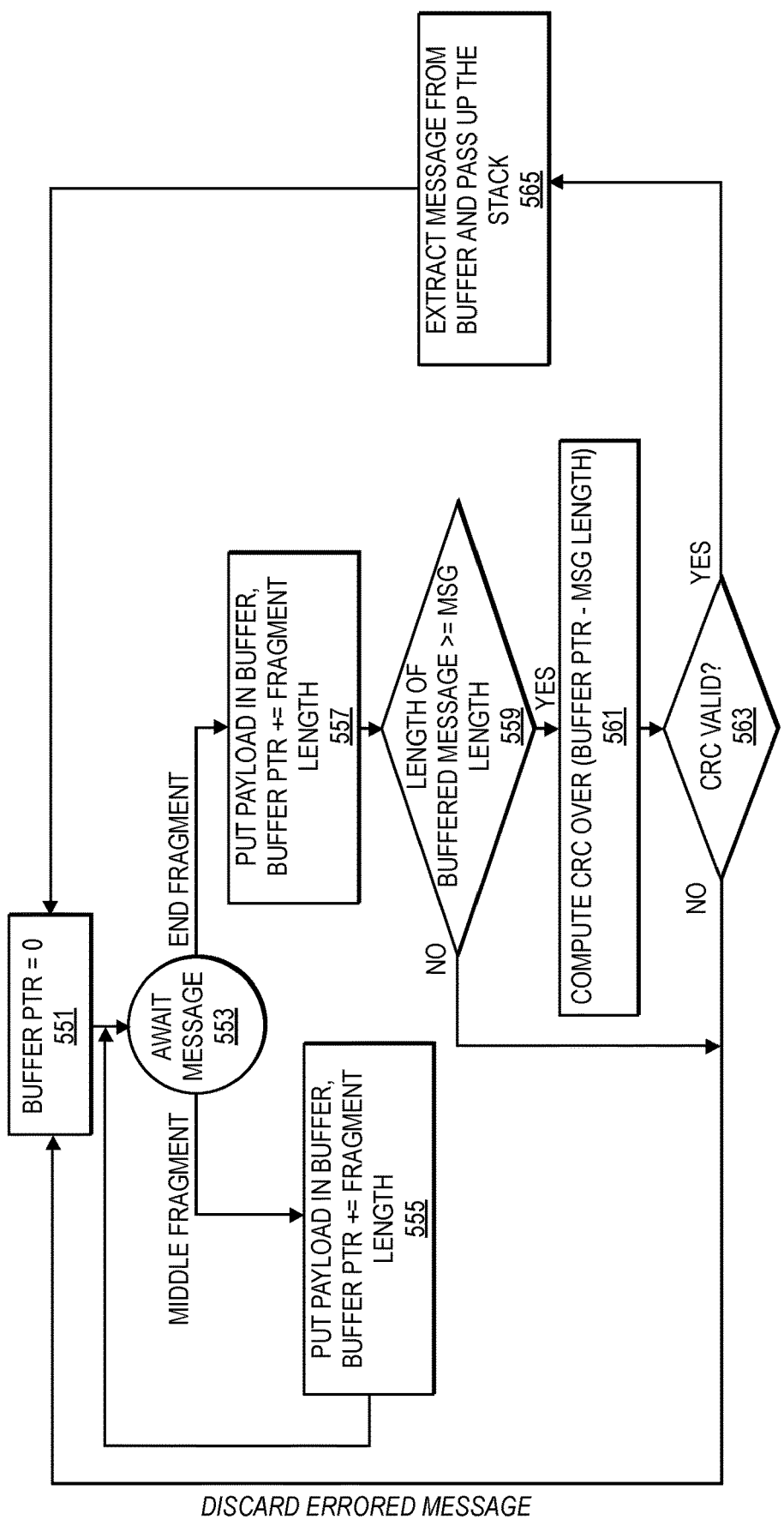
FIG. 5B is a flowchart of one embodiment of another receiver finite state machine for implementing a lighter fragmentation mechanism.

FIG. 5B is a flowchart of one embodiment of the receiver finite state machine for implementing the lighter fragment mechanism. The process of receiving NAS or AS data can be initiated in response to receiving data from the sender. This received data can be stored in a buffer to be processed. In some embodiments, a buffer pointer is used that is initialized to a starting point (e.g., setting the pointer to position 0) (Block 551). The receiver awaits the receipt of fragments from the sender (Block 553). When a middle fragment is received, the payload of the fragment is stored in the buffer and the buffer pointer is increased an amount equivalent to the length of the received fragment (Block 555). The process then continues to await further fragments (Block 553).

When an end fragment is received, the buffer pointer is increased based on the length of the fragment and the payload is stored in the buffer (Block 557). A check is then made to compare the message/SDU length of the received message with an expected message/SDU length as specified in the message metadata (Block 559). If the message/SDU length is greater than the expected message/SDU length, then the receiver sends an error to the application layer and discards the message. The process then resets the buffer pointer and awaits a next message (Blocks 551 and 553).

If the received message/SDU length is the expected message/SDU length, then the process computes the CRC over the message in the buffer (e.g., the data in the buffer at the positions between the buffer pointer and the buffer pointer minus the metadata message/SDU length (Block 561)). If the CRC is not valid, then the message is discarded. The buffer is reset, and the process awaits the next message (Block 551 and 553).

If the CRC is valid, then the message has been validated as being reassembled correctly and is passed up the stack to the application layer (Block 565). The buffer pointer is reset and the process awaits a next message (Block 551 and 553). In one embodiment, the CRC value can be a 32 bit value (e.g., a polynomial specified by section 9.2.1.2 of International Telecommunication Union (ITU) recommendation I.363. The length field can be 16 bits.

Figure 5C:
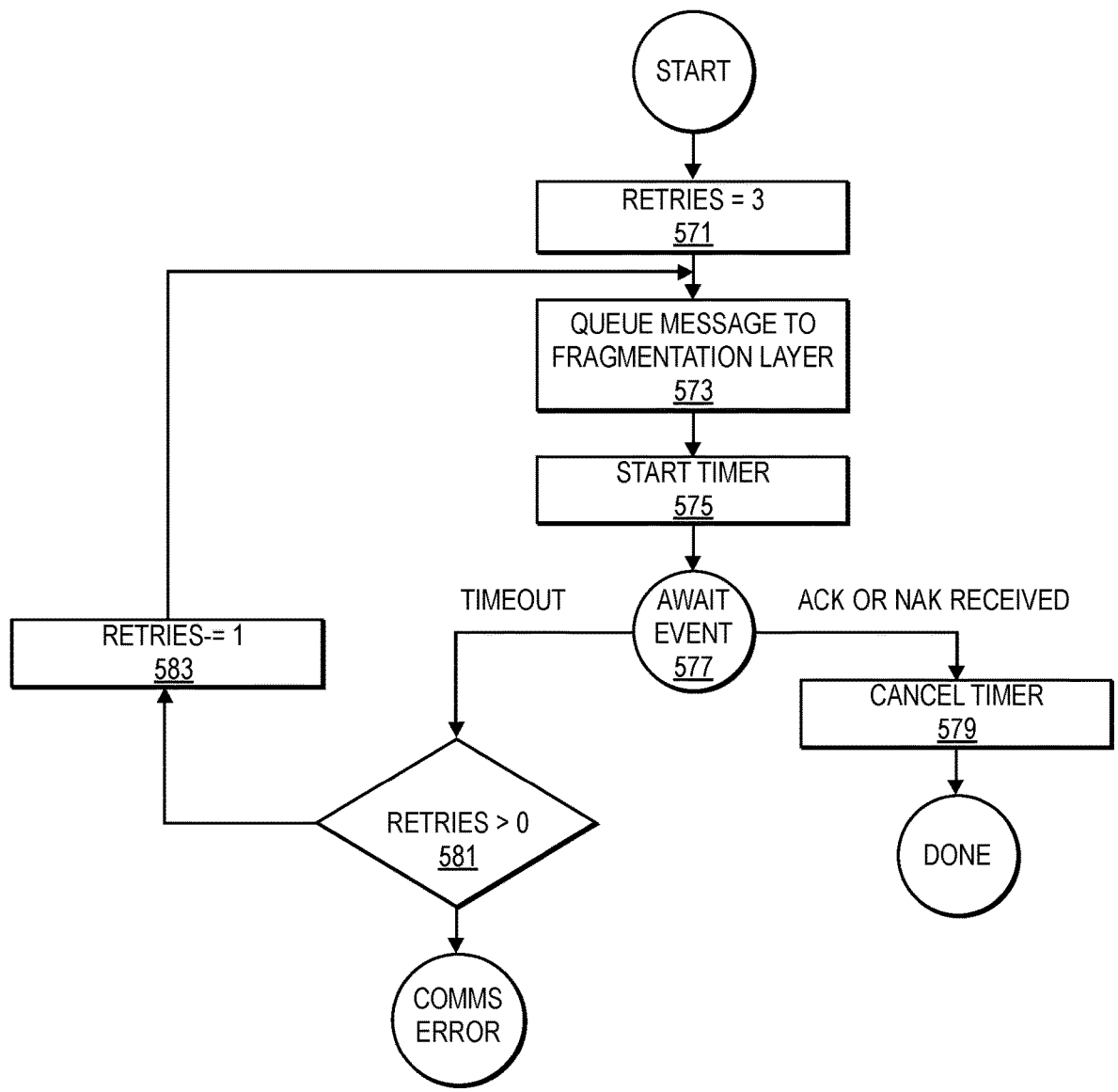
FIG. 5C is a flowchart of one embodiment of a process of an access gateway function (AGF) to support the lighter fragmentation mechanism.

FIG. 5C is a flowchart of one embodiment of a process of an access gateway function (AGF) to support the lighter fragmentation mechanism. In embodiments where the lighter fragmentation mechanism is implemented, the access gateway function (AGF) or similar application layer function can implement handling reliability of AS data by initializing a number of retries for sending the AS data (e.g., initializing to 3 retries) (Block 571). A message to be sent is then queued to the lighter fragmentation mechanism (Block 573). A timer is then started for the message (Block 575). The AGF awaits an event related to the message handling (Block 577). If an acknowledgement or negative acknowledgement is received, the timer is canceled, and the process completes (Block 579). If the timer expires and the number of retries is greater than zero (Block 581), then the number of retries is decremented (Block 583) and the message is requeued (Block 573).

Figure 6B:
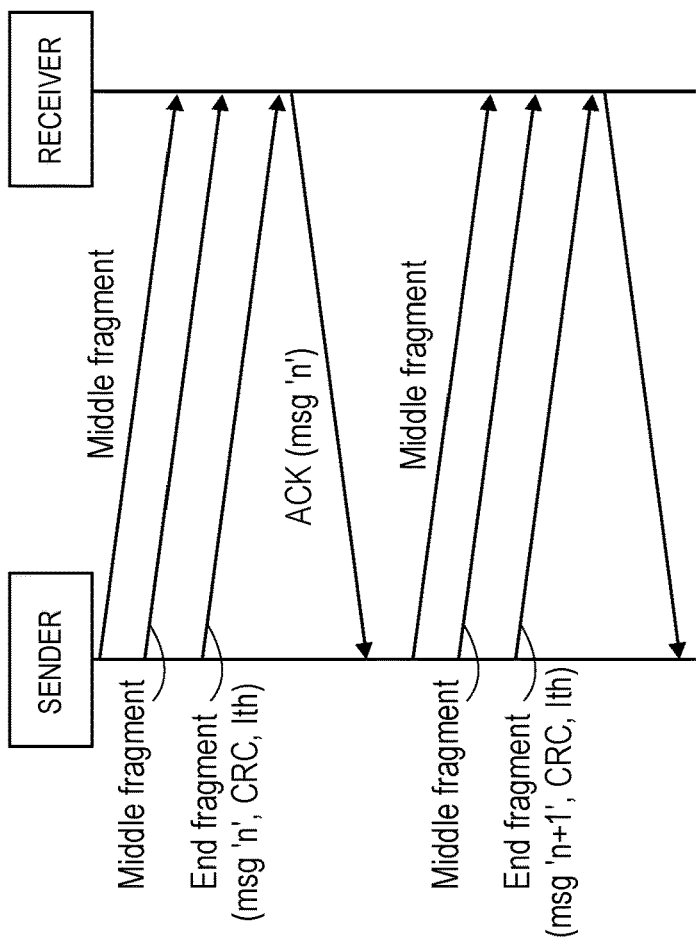
FIGS. 6A-H are diagrams illustrating a set of cases for the operation of the fragmentation mechanism.
Figure 6A:
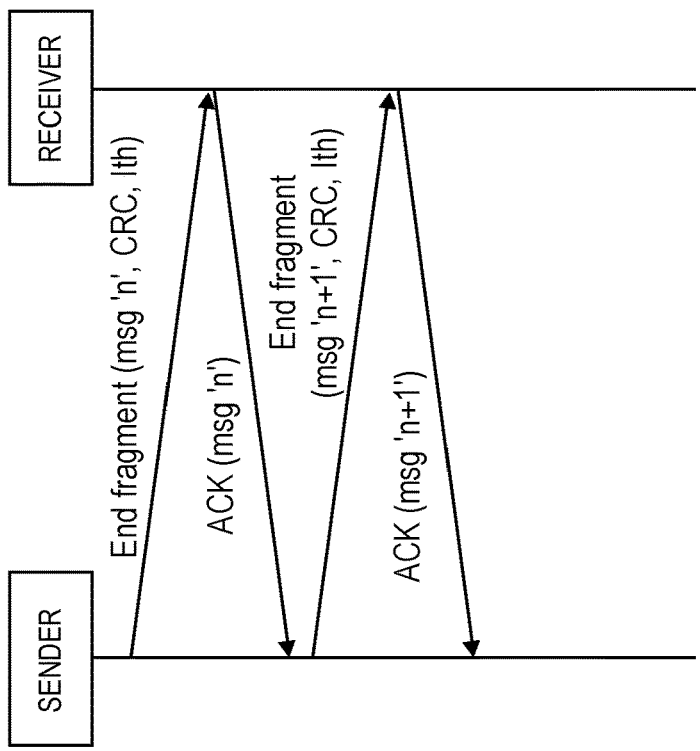

FIGS. 6A-H are diagrams illustrating a set of cases for the operation of the fragmentation mechanism. FIG. 6A is a diagram of the operation of the fragmentation mechanism where a message is successfully transferred without fragmentation. The sender receives a message that fits within an end fragment payload. The end fragment is generated and sent. The receive sends an acknowledgement of the received end fragment. The next message sent is also able to be sent in an end fragment and is similarly acknowledged.

FIG. 6B is a diagram of the operation of the fragmentation mechanism where a set of messages are successfully transferred with fragmentation. The sender receives a first message that is to long for an end fragment. The message is fragmented into two middle fragments and one end fragment. Each fragment is received and the receiver is able to verify and reassemble the message. The receiver sends an acknowledgement after the successful transfer and reassembly. The sender and receiver then repeat the process with a next message.

Figures 6C, 6D:
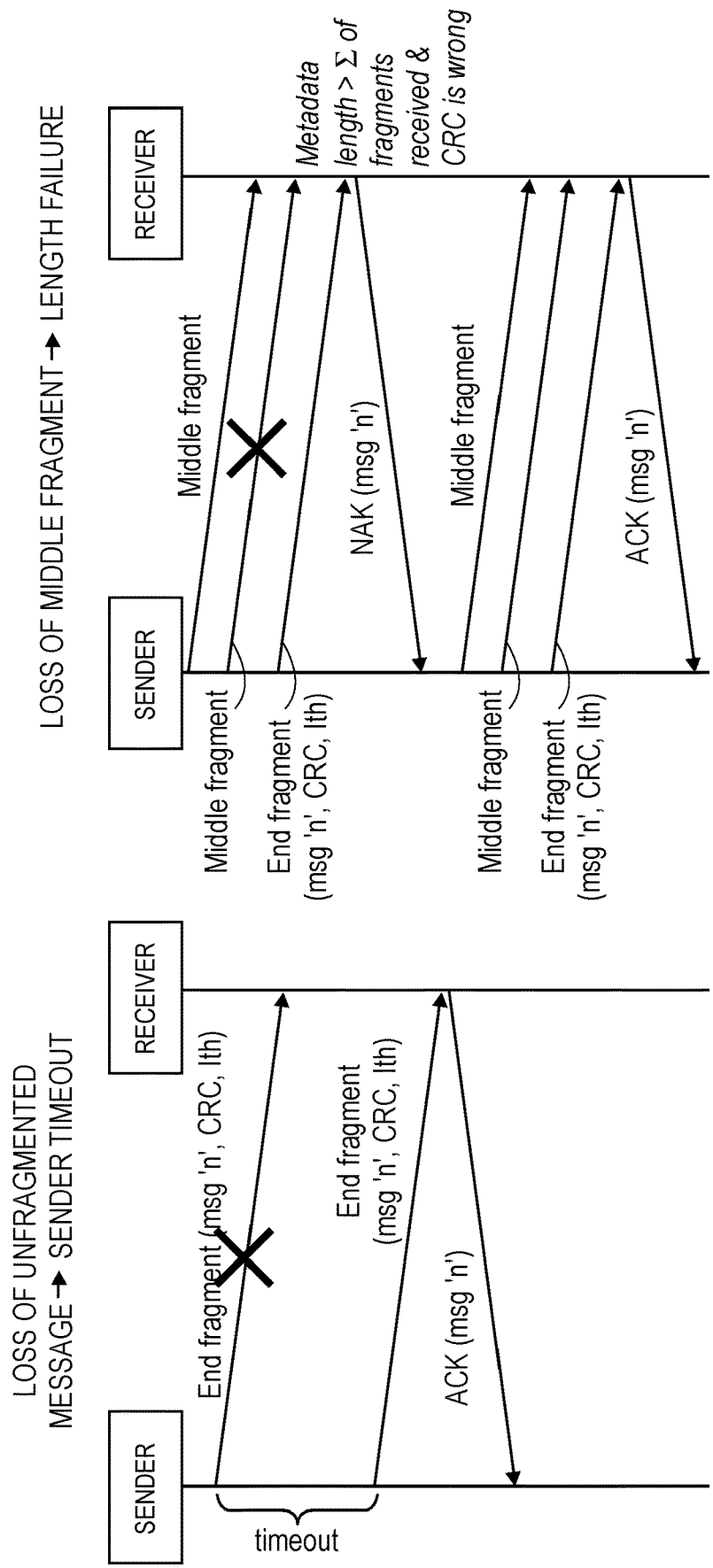

FIG. 6C is a diagram of the operation of the fragmentation mechanism where an unfragmented messaged is lost. The sender generates an end fragment for a message that is sent to the receiver. In this case, the end fragment is lost and does not arrive at the receiver. The sender has a timer that is set when the end fragment is sent. The timer expires because no acknowledgement message is received. In response to the timer expiration, the message is resent. The resent message arrives correctly and the receiver sends an acknowledgement.

FIG. 6D is a diagram of the operation of the fragmentation mechanism where a fragmented message has a lost middle fragment. In this case, the sender generates two middle fragments and one end fragment to send a message to the receiver. The second middle fragment is lost. The receiver attempts to reassemble the message when the end fragment arrives. However, the meta data length specified in the end fragment does not match the message length received. The receiver sends a negative acknowledgement to the sender. The sender then resends the entire message with each of the fragments resent. The resent message is successfully received and acknowledged.

Figure 6E:
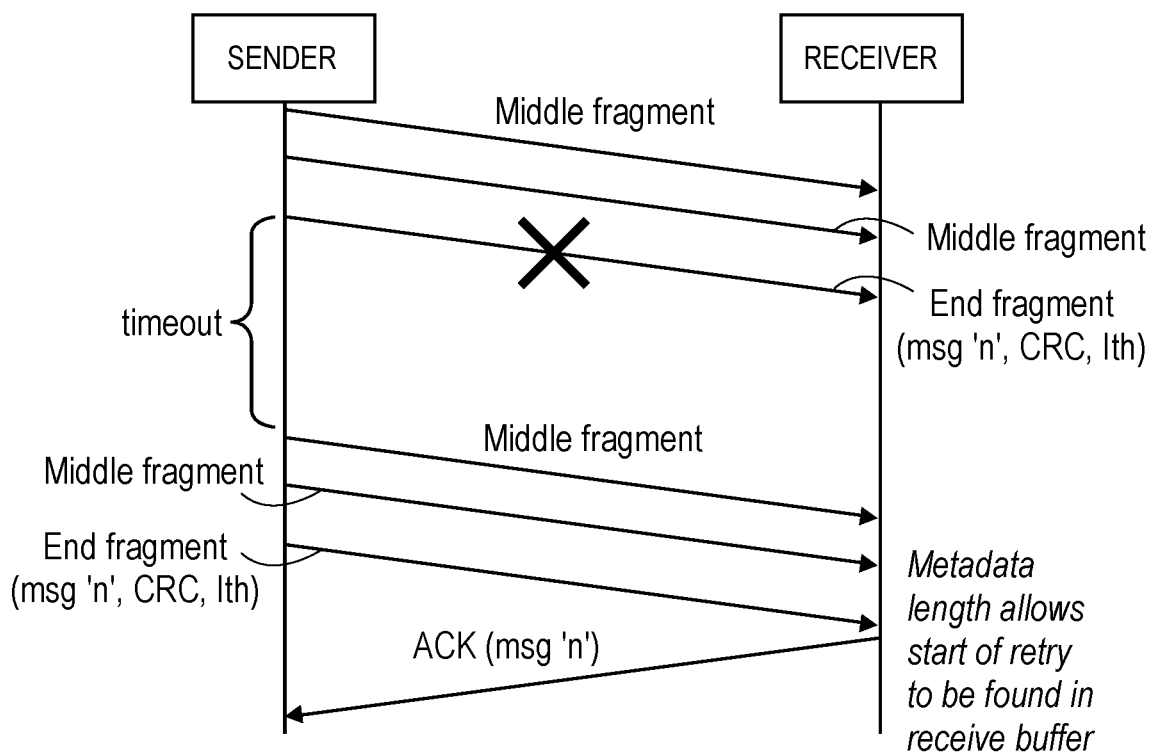

FIG. 6E is a diagram of the operation of the fragmentation mechanism where and end fragment is lost for a fragmented message. In this case, a message being sent is fragmented into three fragments (two middle fragments and one end fragment). The three fragments are sent but the end fragment is lost. The sender sets a timer when the end fragment is sent, which expires due to the loss of the end fragment. After the expiration of the timer, the three fragments are resent. The resent message including each of the three fragments are received and the receiver successfully validates and acknowledges the receipt of the message. The metadata length also enables the receiver to determine the fragments that belong to the resent message and to discard the prior received fragments.

Figure 6F:
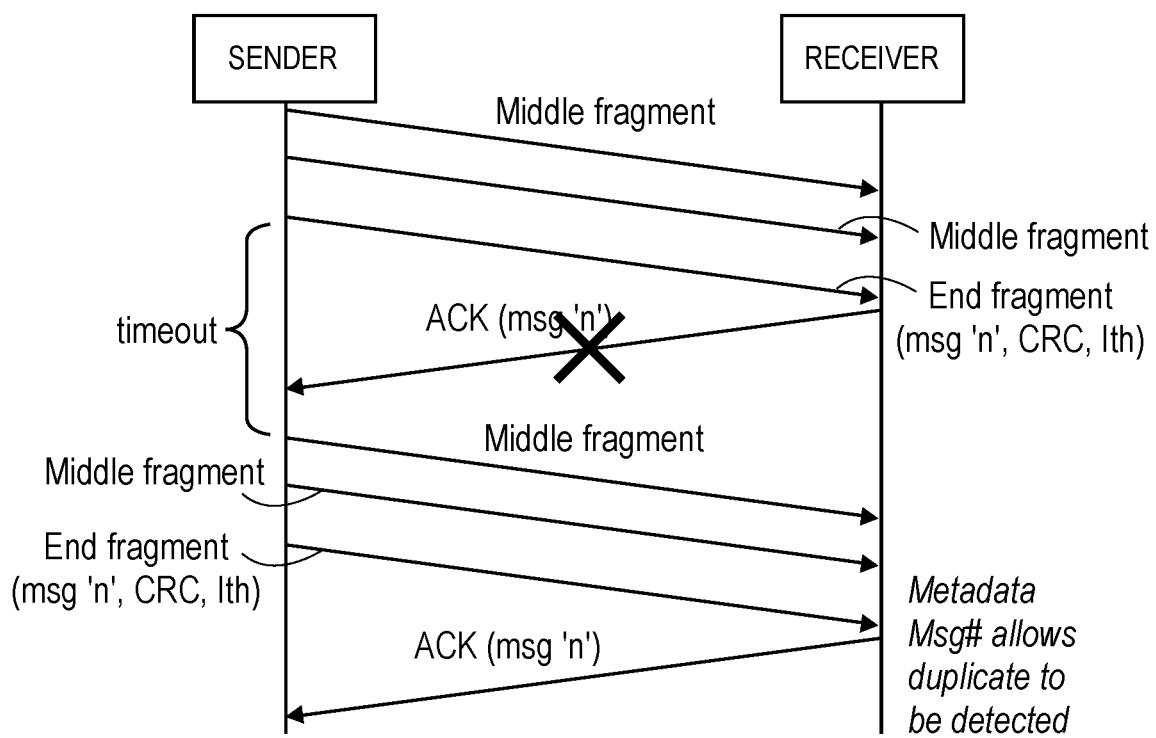

FIG. 6F is a diagram of the operation of the fragmentation mechanism where an acknowledgement of a received message is lost. In this case, a message is fragmented into three fragments by the sender and each is successfully sent to the receiver. The receiver sends an acknowledgement; however, the acknowledgement is lost. This causes a timeout for the sender. As a result, the sender retransmits the entire message including each of the three fragments. When the retransmitted fragments are received, the receiver determines that they are duplicates due to their message number being the same as the last message. The message is not re-processed, but an acknowledgment is sent.

Figure 6G:
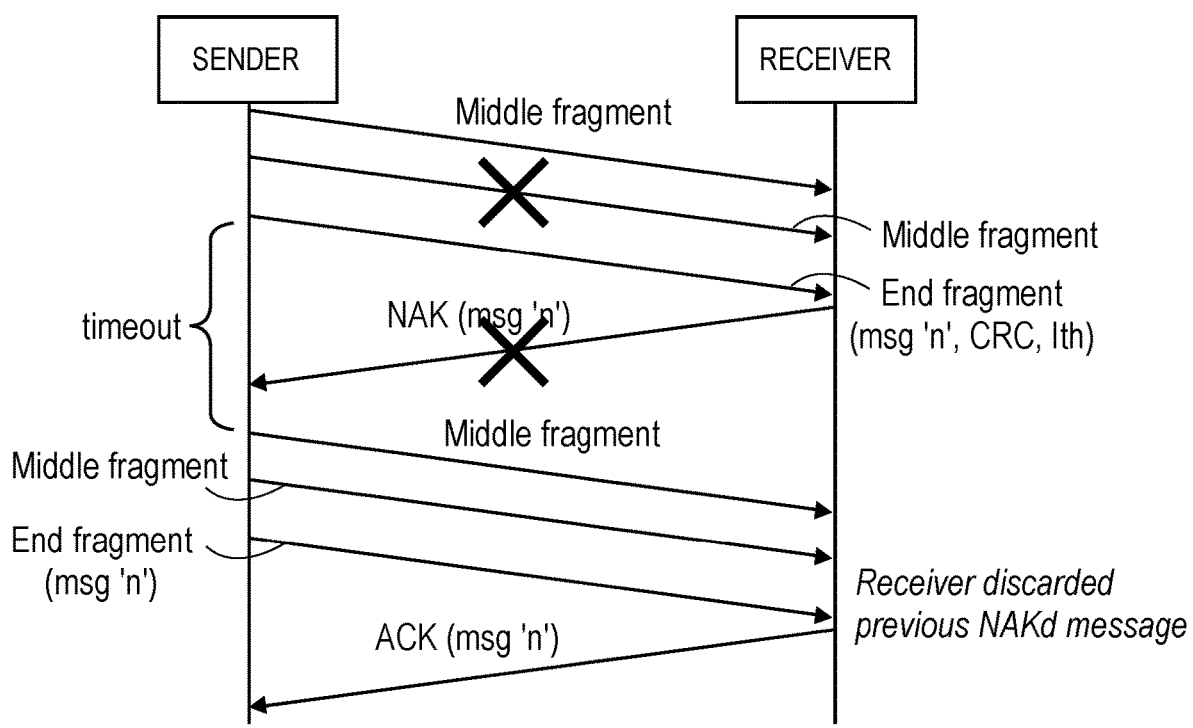

FIG. 6G is a diagram of the operation of the fragmentation mechanism where a negative acknowledgement is lost. In this case, a message is fragmented into three fragments and sent to the receiver. One of the middle fragments is lost. As a result, the receiver sends a negative acknowledgement, because the metadata length does not match the actual received message length. The negative acknowledgement is lost. This causes the sender to have a timeout and consequently resend the entire message. The retransmitted message is successfully received and the fragments from the negatively acknowledged message are discarded.

Figure 6H:
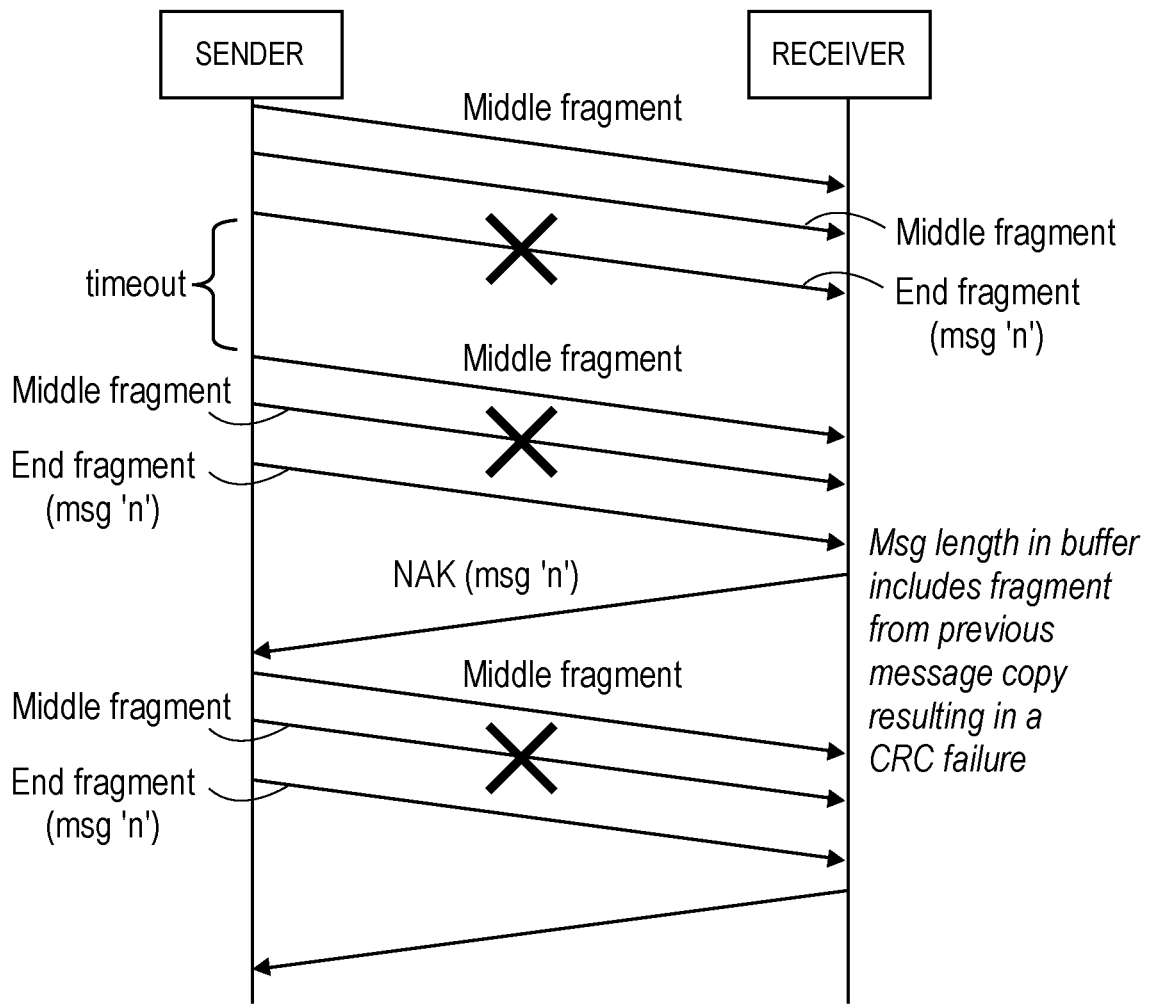

FIG. 6H is a diagram of the operation of the fragmentation mechanism where multiple fragments are lost. In this case, message is fragmented into three fragments. The end fragment is lost during a first transmission of the message. This causes a timeout at the sender, which then resends the entire message. In the retransmission, a middle fragment is lost. The receiver attempts to reassemble the message upon receiving the end fragment of the retransmission. However, the CRC check will fail due to the mixture of prior fragments and retransmitted fragments that will be in the receive buffer. A negative acknowledgement is sent and all the fragments discarded at the receiver. In a second retransmission, the three fragments are successfully transferred and reassembled. The receiver sends an acknowledgment.

Figure 7A:
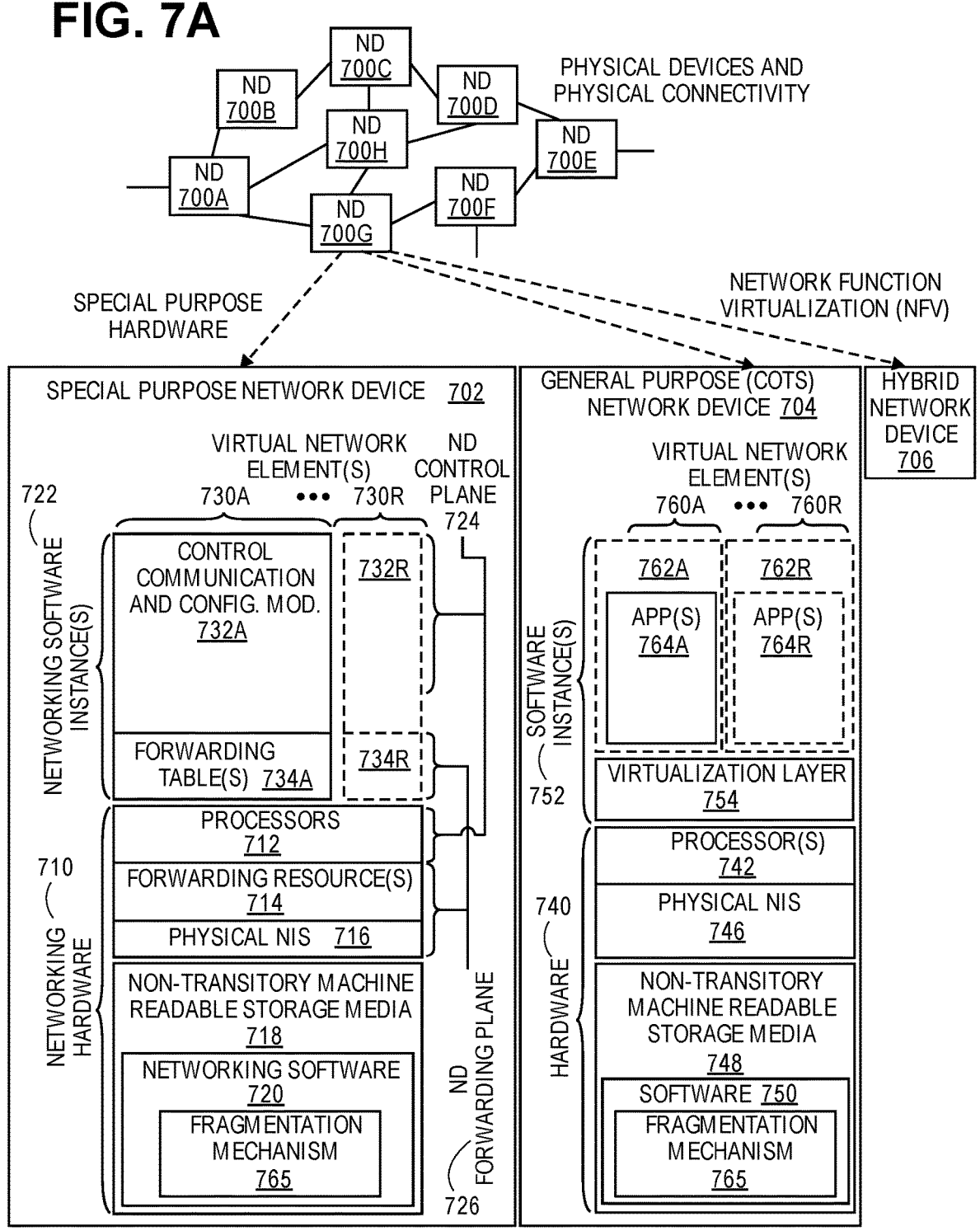
FIG. 7A illustrates connectivity between network devices (NDs) within an exemplary network, as well as three exemplary implementations of the NDs, according to some embodiments of the invention.

FIG. 7A illustrates connectivity between network devices (NDs) within an exemplary network, as well as three exemplary implementations of the NDs, according to some embodiments of the invention. FIG. 7A shows NDs 700A-H, and their connectivity by way of lines between 700A-700B, 700B-700C, 700C-700D, 700D-700E, 700E-700F, 700F-700G, and 700A-700G, as well as between 700H and each of 700A, 700C, 700D, and 700G. These NDs are physical devices, and the connectivity between these NDs can be wireless or wired (often referred to as a link). An additional line extending from NDs 700A, 700E, and 700F illustrates that these NDs act as ingress and egress points for the network (and thus, these NDs are sometimes referred to as edge NDs; while the other NDs may be called core NDs).

Two of the exemplary ND implementations in FIG. 7A are: 1) a special-purpose network device 702 that uses custom application-specific integrated-circuits (ASICs) and a special-purpose operating system (OS); and 2) a general purpose network device 704 that uses common off-the-shelf (COTS) processors and a standard OS.

The special-purpose network device 702 includes networking hardware 710 comprising a set of one or more processor(s) 712, forwarding resource(s) 714 (which typically include one or more ASICs and/or network processors), and physical network interfaces (NIs) 716 (through which network connections are made, such as those shown by the connectivity between NDs 700A-H), as well as non-transitory machine readable storage media 718 having stored therein networking software 720. During operation, the networking software 720 may be executed by the networking hardware 710 to instantiate a set of one or more networking software instance(s) 722. Each of the networking software instance(s) 722, and that part of the networking hardware 710 that executes that network software instance (be it hardware dedicated to that networking software instance and/or time slices of hardware temporally shared by that networking software instance with others of the networking software instance(s) 722), form a separate virtual network element 730A-R. Each of the virtual network element(s) (VNEs) 730A-R includes a control communication and configuration module 732A-R (sometimes referred to as a local control module or control communication module) and forwarding table(s) 734A-R, such that a given virtual network element (e.g., 730A) includes the control communication and configuration module (e.g., 732A), a set of one or more forwarding table(s) (e.g., 734A), and that portion of the networking hardware 710 that executes the virtual network element (e.g., 730A).

The networking software 720 can include the fragmentation mechanism 765 as described herein. The fragmentation mechanism 765 can be implemented as part of networking software 720 or as a separate set of functions. The fragmentation mechanism 765 can include both the sender and receiver functions or the functions of the sender and receiver can be separate.

The special-purpose network device 702 is often physically and/or logically considered to include: 1) a ND control plane 724 (sometimes referred to as a control plane) comprising the processor(s) 712 that execute the control communication and configuration module(s) 732A-R; and 2) a ND forwarding plane 726 (sometimes referred to as a forwarding plane, a data plane, or a media plane) comprising the forwarding resource(s) 714 that utilize the forwarding table(s) 734A-R and the physical NIs 716. By way of example, where the ND is a router (or is implementing routing functionality), the ND control plane 724 (the processor(s) 712 executing the control communication and configuration module(s) 732A-R) is typically responsible for participating in controlling how data (e.g., packets) is to be routed (e.g., the next hop for the data and the outgoing physical NI for that data) and storing that routing information in the forwarding table(s) 734A-R, and the ND forwarding plane 726 is responsible for receiving that data on the physical NIs 716 and forwarding that data out the appropriate ones of the physical NIs 716 based on the forwarding table(s) 734A-R.

Figure 7B:
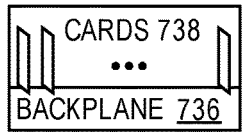
FIG. 7B illustrates an exemplary way to implement a special-purpose network device according to some embodiments of the invention.

FIG. 7B illustrates an exemplary way to implement the special-purpose network device 702 according to some embodiments of the invention. FIG. 7B shows a special-purpose network device including cards 738 (typically hot pluggable). While in some embodiments the cards 738 are of two types (one or more that operate as the ND forwarding plane 726 (sometimes called line cards), and one or more that operate to implement the ND control plane 724 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 736 (e.g., a first full mesh coupling the line cards and a second full mesh coupling all of the cards).

Returning to FIG. 7A, the general purpose network device 704 includes hardware 740 comprising a set of one or more processor(s) 742 (which are often COTS processors) and physical NIs 746, as well as non-transitory machine readable storage media 748 having stored therein software 750. During operation, the processor(s) 742 execute the software 750 to instantiate one or more sets of one or more applications 764A-R. While one embodiment does not implement virtualization, alternative embodiments may use different forms of virtualization. For example, in one such alternative embodiment the virtualization layer 754 represents the kernel of an operating system (or a shim executing on a base operating system) that allows for the creation of multiple instances 762A-R called software containers that may each be used to execute one (or more) of the sets of applications 764A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 754 represents a hypervisor (sometimes referred to as a virtual machine monitor (VMM)) or a hypervisor executing on top of a host operating system, and each of the sets of applications 764A-R is run on top of a guest operating system within an instance 762A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 740, directly on a hypervisor (in which case the unikernel is sometimes described as running within a LibOS virtual machine), or in a software container, embodiments can be implemented fully with unikernels running directly on a hypervisor represented by virtualization layer 754, unikernels running within software containers represented by instances 762A-R, or as a combination of unikernels and the above-described techniques (e.g., unikernels and virtual machines both run directly on a hypervisor, unikernels and sets of applications that are run in different software containers).

The software 750 can include the fragmentation mechanism 765 as described herein. The fragmentation mechanism 765 can be implemented as part of software 750 or as a separate set of functions. The fragmentation mechanism 765 can include both the sender and receiver functions or the functions of the sender and receiver can be separate.

The instantiation of the one or more sets of one or more applications 764A-R, as well as virtualization if implemented, are collectively referred to as software instance(s) 752. Each set of applications 764A-R, corresponding virtualization construct (e.g., instance 762A-R) if implemented, and that part of the hardware 740 that executes them (be it hardware dedicated to that execution and/or time slices of hardware temporally shared), forms a separate virtual network element(s) 760A-R.

The virtual network element(s) 760A-R perform similar functionality to the virtual network element(s) 730A-R—e.g., similar to the control communication and configuration module(s) 732A and forwarding table(s) 734A (this virtualization of the hardware 740 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 762A-R corresponding to one VNE 760A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 762A-R to VNEs also apply to embodiments where such a finer level of granularity and/or unikernels are used.

In certain embodiments, the virtualization layer 754 includes a virtual switch that provides similar forwarding services as a physical Ethernet switch. Specifically, this virtual switch forwards traffic between instances 762A-R and the physical NI(s) 746, as well as optionally between the instances 762A-R; in addition, this virtual switch may enforce network isolation between the VNEs 760A-R that by policy are not permitted to communicate with each other (e.g., by honoring virtual local area networks (VLANs)).

The third exemplary ND implementation in FIG. 7A is a hybrid network device 706, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 702) could provide for para-virtualization to the networking hardware present in the hybrid network device 706.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 730A-R, VNEs 760A-R, and those in the hybrid network device 706) receives data on the physical NIs (e.g., 716, 746) and forwards that data out the appropriate ones of the physical NIs (e.g., 716, 746). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 7C:
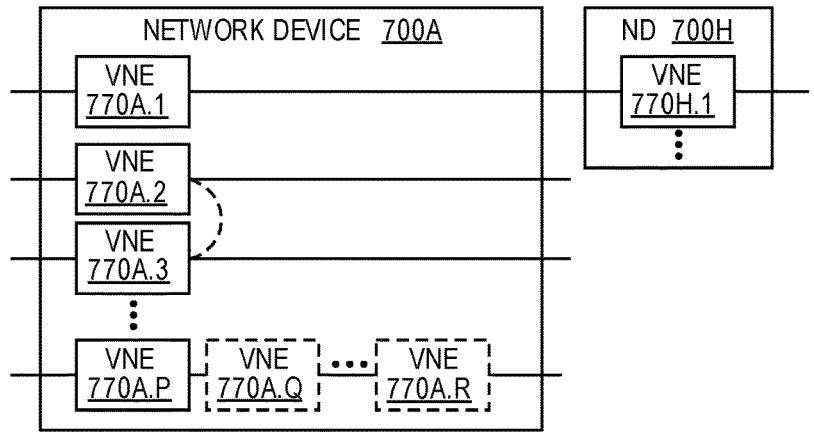
FIG. 7C illustrates various exemplary ways in which virtual network elements (VNEs) may be coupled according to some embodiments of the invention.

FIG. 7C illustrates various exemplary ways in which VNEs may be coupled according to some embodiments of the invention. FIG. 7C shows VNEs 770A.1-770A.P (and optionally VNEs 770A.Q-770A.R) implemented in ND 700A and VNE 770H.1 in ND 700H. In FIG. 7C, VNEs 770A.1-P are separate from each other in the sense that they can receive packets from outside ND 700A and forward packets outside of ND 700A; VNE 770A.1 is coupled with VNE 770H.1, and thus they communicate packets between their respective NDs; VNE 770A.2-770A.3 may optionally forward packets between themselves without forwarding them outside of the ND 700A; and VNE 770A.P may optionally be the first in a chain of VNEs that includes VNE 770A.Q followed by VNE 770A.R (this is sometimes referred to as dynamic service chaining, where each of the VNEs in the series of VNEs provides a different service— e.g., one or more layer 4-7 network services). While FIG. 7C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 7A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 7A may also host one or more such servers (e.g., in the case of the general purpose network device 704, one or more of the software instances 762A-R may operate as servers; the same would be true for the hybrid network device 706; in the case of the special-purpose network device 702, one or more such servers could also be run on a virtualization layer executed by the processor(s) 712); in which case the servers are said to be co-located with the VNEs of that ND.

A virtual network is a logical abstraction of a physical network (such as that in FIG. 7A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 7D:
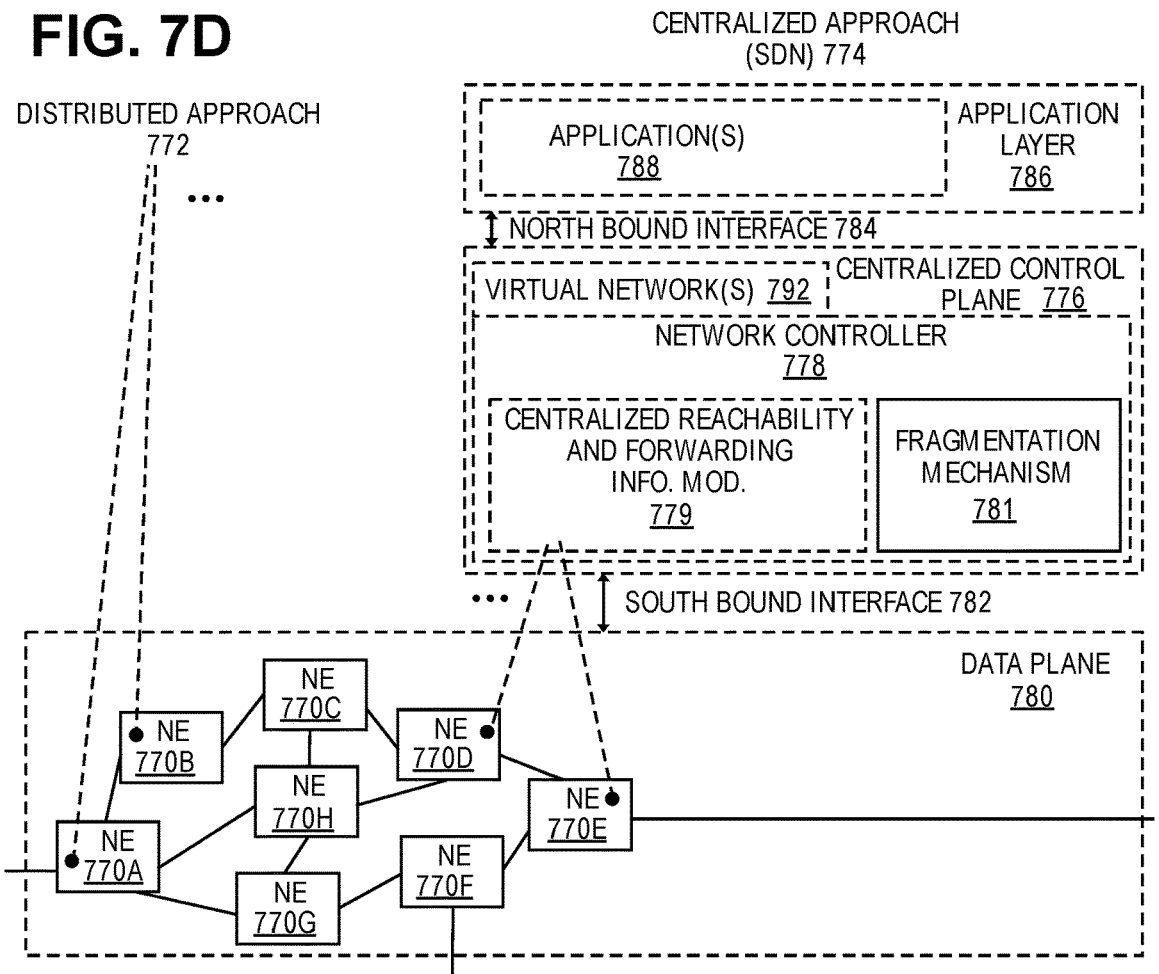
FIG. 7D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 7D illustrates a network with a single network element on each of the NDs of FIG. 7A, and within this straight forward approach contrasts a traditional distributed approach (commonly used by traditional routers) with a centralized approach for maintaining reachability and forwarding information (also called network control), according to some embodiments of the invention. Specifically, FIG. 7D illustrates network elements (NEs) 770A-H with the same connectivity as the NDs 700A-H of FIG. 7A.

FIG. 7D illustrates that the distributed approach 772 distributes responsibility for generating the reachability and forwarding information across the NEs 770A-H; in other words, the process of neighbor discovery and topology discovery is distributed.

For example, where the special-purpose network device 702 is used, the control communication and configuration module(s) 732A-R of the ND control plane 724 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 770A-H (e.g., the processor(s) 712 executing the control communication and configuration module(s) 732A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 724. The ND control plane 724 programs the ND forwarding plane 726 with information (e.g., adjacency and route information) based on the routing structure(s). For example, the ND control plane 724 programs the adjacency and route information into one or more forwarding table(s) 734A-R (e.g., Forwarding Information Base (FIB), Label Forwarding Information Base (LFIB), and one or more adjacency structures) on the ND forwarding plane 726. For layer 2 forwarding, the ND can store one or more bridging tables that are used to forward data based on the layer 2 information in that data. While the above example uses the special-purpose network device 702, the same distributed approach 772 can be implemented on the general purpose network device 704 and the hybrid network device 706.

FIG. 7D illustrates that a centralized approach 774 (also known as software defined networking (SDN)) that decouples the system that makes decisions about where traffic is sent from the underlying systems that forwards traffic to the selected destination. The illustrated centralized approach 774 has the responsibility for the generation of reachability and forwarding information in a centralized control plane 776 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 776 has a south bound interface 782 with a data plane 780 (sometime referred to the infrastructure layer, network forwarding plane, or forwarding plane (which should not be confused with a ND forwarding plane)) that includes the NEs 770A-H (sometimes referred to as switches, forwarding elements, data plane elements, or nodes). The centralized control plane 776 includes a network controller 778, which includes a centralized reachability and forwarding information module 779 that determines the reachability within the network and distributes the forwarding information to the NEs 770A-H of the data plane 780 over the south bound interface 782 (which may use the OpenFlow protocol). Thus, the network intelligence is centralized in the centralized control plane 776 executing on electronic devices that are typically separate from the NDs.

The network controller 778, applications 788, or similar control plane components can include the fragmentation mechanism 781 as described herein. The fragmentation mechanism 781 can be implemented as part of network controller 778 or as a separate set of functions. The fragmentation mechanism 765 can include both the sender and receiver functions or the functions of the sender and receiver can be separate.

For example, where the special-purpose network device 702 is used in the data plane 780, each of the control communication and configuration module(s) 732A-R of the ND control plane 724 typically include a control agent that provides the VNE side of the south bound interface 782. In this case, the ND control plane 724 (the processor(s) 712 executing the control communication and configuration module(s) 732A-R) performs its responsibility for participating in controlling how data (e.g., packets) is to be routed (e.g., the next hop for the data and the outgoing physical NI for that data) through the control agent communicating with the centralized control plane 776 to receive the forwarding information (and in some cases, the reachability information) from the centralized reachability and forwarding information module 779 (it should be understood that in some embodiments of the invention, the control communication and configuration module(s) 732A-R, in addition to communicating with the centralized control plane 776, may also play some role in determining reachability and/or calculating forwarding information—albeit less so than in the case of a distributed approach; such embodiments are generally considered to fall under the centralized approach 774, but may also be considered a hybrid approach).

While the above example uses the special-purpose network device 702, the same centralized approach 774 can be implemented with the general purpose network device 704 (e.g., each of the VNE 760A-R performs its responsibility for controlling how data (e.g., packets) is to be routed (e.g., the next hop for the data and the outgoing physical NI for that data) by communicating with the centralized control plane 776 to receive the forwarding information (and in some cases, the reachability information) from the centralized reachability and forwarding information module 779; it should be understood that in some embodiments of the invention, the VNEs 760A-R, in addition to communicating with the centralized control plane 776, may also play some role in determining reachability and/or calculating forwarding information—albeit less so than in the case of a distributed approach) and the hybrid network device 706. In fact, the use of SDN techniques can enhance the NFV techniques typically used in the general purpose network device 704 or hybrid network device 706 implementations as NFV is able to support SDN by providing an infrastructure upon which the SDN software can be run, and NFV and SDN both aim to make use of commodity server hardware and physical switches.

FIG. 7D also shows that the centralized control plane 776 has a north bound interface 784 to an application layer 786, in which resides application(s) 788. The centralized control plane 776 has the ability to form virtual networks 792 (sometimes referred to as a logical forwarding plane, network services, or overlay networks (with the NEs 770A-H of the data plane 780 being the underlay network)) for the application(s) 788. Thus, the centralized control plane 776 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 7D shows the distributed approach 772 separate from the centralized approach 774, the effort of network control may be distributed differently or the two combined in certain embodiments of the invention. For example: 1) embodiments may generally use the centralized approach (SDN) 774, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 774, but may also be considered a hybrid approach.

While FIG. 7D illustrates the simple case where each of the NDs 700A-H implements a single NE 770A-H, it should be understood that the network control approaches described with reference to FIG. 7D also work for networks where one or more of the NDs 700A-H implement multiple VNEs (e.g., VNEs 730A-R, VNEs 760A-R, those in the hybrid network device 706). Alternatively or in addition, the network controller 778 may also emulate the implementation of multiple VNEs in a single ND. Specifically, instead of (or in addition to) implementing multiple VNEs in a single ND, the network controller 778 may present the implementation of a VNE/NE in a single ND as multiple VNEs in the virtual networks 792 (all in the same one of the virtual network(s) 792, each in different ones of the virtual network(s) 792, or some combination). For example, the network controller 778 may cause an ND to implement a single VNE (a NE) in the underlay network, and then logically divide up the resources of that NE within the centralized control plane 776 to present different VNEs in the virtual network(s) 792 (where these different VNEs in the overlay networks are sharing the resources of the single VNE/NE implementation on the ND in the underlay network).

Figure 7E:
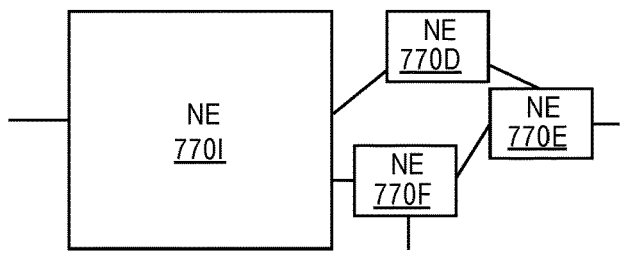
FIG. 7E illustrates the simple case of where each of the NDs implements a single NE, but a centralized control plane has abstracted multiple of the NEs in different NDs into (to represent) a single NE in one of the virtual network(s), according to some embodiments of the invention.
Figure 7F:
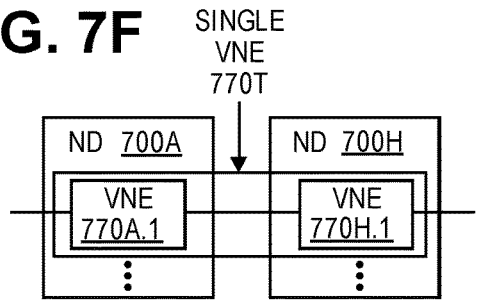
FIG. 7F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 7E and 7F respectively illustrate exemplary abstractions of NEs and VNEs that the network controller 778 may present as part of different ones of the virtual networks 792. FIG. 7E illustrates the simple case of where each of the NDs 700A-H implements a single NE 770A-H (see FIG. 7D), but the centralized control plane 776 has abstracted multiple of the NEs in different NDs (the NEs 770A-C and G-H) into (to represent) a single NE 7701 in one of the virtual network(s) 792 of FIG. 7D, according to some embodiments of the invention. FIG. 7E shows that in this virtual network, the NE 7701 is coupled to NE 770D and 770F, which are both still coupled to NE 770E.

FIG. 7F illustrates a case where multiple VNEs (VNE 770A.1 and VNE 770H.1) are implemented on different NDs (ND 700A and ND 700H) and are coupled to each other, and where the centralized control plane 776 has abstracted these multiple VNEs such that they appear as a single VNE 770T within one of the virtual networks 792 of FIG. 7D, according to some embodiments of the invention. Thus, the abstraction of a NE or VNE can span multiple NDs.

While some embodiments of the invention implement the centralized control plane 776 as a single entity (e.g., a single instance of software running on a single electronic device), alternative embodiments may spread the functionality across multiple entities for redundancy and/or scalability purposes (e.g., multiple instances of software running on different electronic devices).

Figure 8:
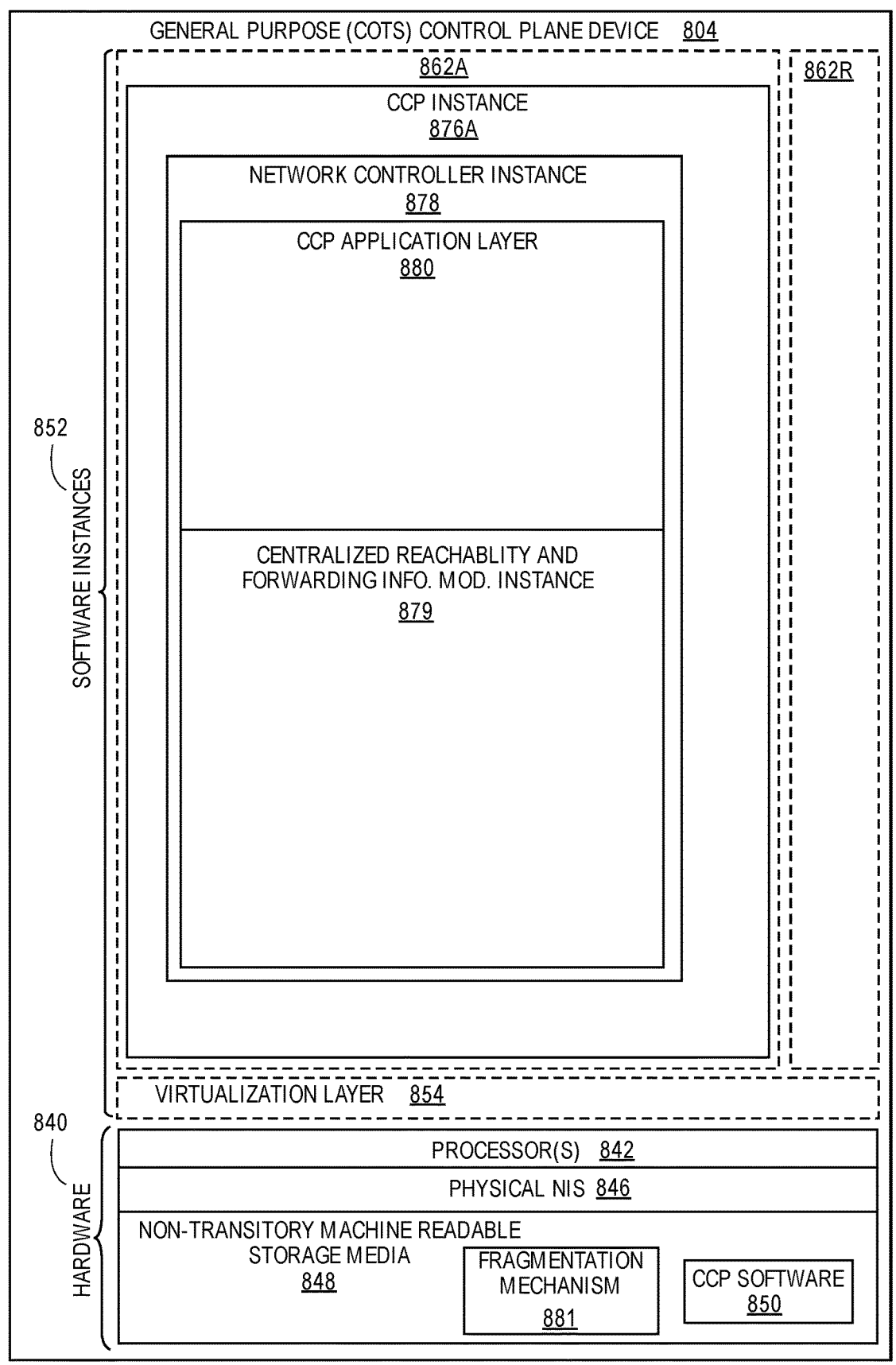
FIG. 8 illustrates a general purpose control plane device with centralized control plane (CCP) software 850), according to some embodiments of the invention.

Similar to the network device implementations, the electronic device(s) running the centralized control plane 776, and thus the network controller 778 including the centralized reachability and forwarding information module 779, may be implemented a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software. For instance, FIG. 8 illustrates, a general purpose control plane device 804 including hardware 840 comprising a set of one or more processor(s) 842 (which are often COTS processors) and physical NIs 846, as well as non-transitory machine readable storage media 848 having stored therein centralized control plane (CCP) software 850.

The non-transitory machine readable medium 848 can include the fragmentation mechanism 881 as described herein. The fragmentation mechanism 765 can be implemented as part of network controller instance 878 or as a separate set of functions. The fragmentation mechanism 881 can include both the sender and receiver functions or the functions of the sender and receiver can be separate.

In embodiments that use compute virtualization, the processor(s) 842 typically execute software to instantiate a virtualization layer 854 (e.g., in one embodiment the virtualization layer 854 represents the kernel of an operating system (or a shim executing on a base operating system) that allows for the creation of multiple instances 862A-R called software containers (representing separate user spaces and also called virtualization engines, virtual private servers, or jails) that may each be used to execute a set of one or more applications; in another embodiment the virtualization layer 854 represents a hypervisor (sometimes referred to as a virtual machine monitor (VMM)) or a hypervisor executing on top of a host operating system, and an application is run on top of a guest operating system within an instance 862A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 840, directly on a hypervisor represented by virtualization layer 854 (in which case the unikernel is sometimes described as running within a LibOS virtual machine), or in a software container represented by one of instances 862A-R). Again, in embodiments where compute virtualization is used, during operation an instance of the CCP software 850 (illustrated as CCP instance 876A) is executed (e.g., within the instance 862A) on the virtualization layer 854. In embodiments where compute virtualization is not used, the CCP instance 876A is executed, as a unikernel or on top of a host operating system, on the "bare metal" general purpose control plane device 804. The instantiation of the CCP instance 876A, as well as the virtualization layer 854 and instances 862A-R if implemented, are collectively referred to as software instance(s) 852.

In some embodiments, the CCP instance 876A includes a network controller instance 878. The network controller instance 878 includes a centralized reachability and forwarding information module instance 879 (which is a middleware layer providing the context of the network controller 778 to the operating system and communicating with the various NEs), and an CCP application layer 880 (sometimes referred to as an application layer) over the middleware layer (providing the intelligence required for various network operations such as protocols, network situational awareness, and user—interfaces). At a more abstract level, this CCP application layer 880 within the centralized control plane 776 works with virtual network view(s) (logical view(s) of the network) and the middleware layer provides the conversion from the virtual networks to the physical view.

The centralized control plane 776 transmits relevant messages to the data plane 780 based on CCP application layer 880 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 780 may receive different messages, and thus different forwarding information. The data plane 780 processes these messages and programs the appropriate flow information and corresponding actions in the forwarding tables (sometimes referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 780, the packet (or a subset of the packet header and content) is typically forwarded to the centralized control plane 776. The centralized control plane 776 will then program forwarding table entries into the data plane 780 to accommodate packets belonging to the flow of the unknown packet. Once a specific forwarding table entry has been programmed into the data plane 780 by the centralized control plane 776, the next packet with matching credentials will match that forwarding table entry and take the set of actions associated with that matched entry.

A virtual circuit (VC), synonymous with virtual connection and virtual channel, is a connection oriented communication service that is delivered by means of packet mode communication. Virtual circuit communication resembles circuit switching, since both are connection oriented, meaning that in both cases data is delivered in correct order, and signaling overhead is required during a connection establishment phase. Virtual circuits may exist at different layers. For example, at layer 4, a connection oriented transport layer datalink protocol such as Transmission Control Protocol (TCP) may rely on a connectionless packet switching network layer protocol such as IP, where different packets may be routed over different paths, and thus be delivered out of order. Where a reliable virtual circuit is established with TCP on top of the underlying unreliable and connectionless IP protocol, the virtual circuit is identified by the source and destination network socket address pair, i.e. the sender and receiver IP address and port number. However, a virtual circuit is possible since TCP includes segment numbering and reordering on the receiver side to prevent out-of-order delivery. Virtual circuits are also possible at Layer 3 (network layer) and Layer 2 (datalink layer); such virtual circuit protocols are based on connection oriented packet switching, meaning that data is always delivered along the same network path, i.e. through the same NEs/VNEs. In such protocols, the packets are not routed individually and complete addressing information is not provided in the header of each data packet; only a small virtual channel identifier (VCI) is required in each packet; and routing information is transferred to the NEs/VNEs during the connection establishment phase; switching only involves looking up the virtual channel identifier in a table rather than analyzing a complete address. Examples of network layer and datalink layer virtual circuit protocols, where data always is delivered over the same path: X.25, where the VC is identified by a virtual channel identifier (VCI); Frame relay, where the VC is identified by a VCI; Asynchronous Transfer Mode (ATM), where the circuit is identified by a virtual path identifier (VPI) and virtual channel identifier (VCI) pair; General Packet Radio Service (GPRS); and Multiprotocol label switching (MPLS), which can be used for IP over virtual circuits (Each circuit is identified by a label).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method to implement a fragmentation mechanism for a session between a 5G-residential gateway (5G-RG) and access gateway function (AGF) communicating over point to point protocol over Ethernet (PPPoE) that encapsulates control messages, where the 5G-RG or the AGF is a sender of a message, the method comprising:
   receiving the message to be sent that does not fit within a maximum transmission unit for the session;
   generating a first fragment of the message and a second fragment of the message; and
   sending the first fragment of the message and the second fragment of the message to a receiver, the second fragment including metadata with a length of the message, and a cyclic redundancy check.

2. The method of claim 1, further comprising:
   starting a timer in response to sending the second fragment.

3. The method of claim 2, further comprising:
   resending the first fragment and the second fragment in response to the timer expiring.

4. The method of claim 2, further comprising:
   cancelling the timer in response to receiving an acknowledgement from the receiver.

5. The method of claim 2, further comprising:
   generating a communication error in response to the timer expiring or a negative acknowledgement and a number of retries being exhausted.

6. A method to implement a fragmentation mechanism for a session between a 5G-residential gateway (5G-RG) and access gateway function (AGF) communicating over point to point protocol over Ethernet (PPPoE) that encapsulates control message, where the 5G-RG or the AGF is a receiver of a message, the method comprising:
   receiving a first fragment and a second fragment of the message from a sender;
   determining whether the second fragment is an end fragment, the end fragment including metadata with a length of the message, and a cyclic redundancy check;
   checking the length against the first fragment and the second fragment;
   validating the cyclic redundancy check; and
   extracting the message from the first fragment and second fragment in response to the length and the cyclic redundancy check being correct.

7. The method of claim 6, further comprising:
   sending an acknowledgement to the sender, in response to a message number, the length, and the cyclic redundancy check being correct.

8. The method of claim 6, further comprising:
   sending a negative acknowledgement or discarding the message, in response to the length not correlating with the first fragment and the second fragment or the cyclic redundancy check failing.

9. The method of claim 6, further comprising:
   sending an acknowledgement and discarding a duplicate message, in response to a message number matching a prior message number.

10. The method of claim 6, wherein the message is an access stratum (AS) or non-access stratum (NAS) message.

11. A computing device to implement a method of a fragmentation mechanism for a session between a 5G-residential gateway (5G-RG) and access gateway function (AGF) communicating over point to point protocol over Ethernet (PPPoE) that encapsulates control messages, where the 5G-RG or the AGF is a sender of a message, the computing device comprising:
   a non-transitory machine readable medium having stored therein the fragmentation mechanism; and
   a processor coupled to the non-transitory machine readable medium, the processor to execute the fragmentation mechanism, the fragmentation mechanism to receive the message to be sent that does not fit within a maximum transmission unit for the session, to generate a first fragment of the message and a second fragment of the message, and to send the first fragment of the message and the second fragment of the message to a receiver, the second fragment including a metadata with a length of the message, and a cyclic redundancy check.

12. The computing device of claim 11, wherein the fragmentation mechanism is further to start a timer in response to sending the second fragment.

13. The computing device of claim 12, wherein the fragmentation mechanism is further to resend the first fragment and the second fragment in response to the timer expiring.

14. The computing device of claim 12, wherein the fragmentation mechanism is further to cancel the timer in response to receiving an acknowledgement from the receiver.

15. The computing device of claim 12, wherein the fragmentation mechanism is further to generate a communication error in response to the timer expiring or a negative acknowledgement and a number of retries being exhausted.

16. A computing device to implement a method of a fragmentation mechanism for a session between a 5G-residential gateway (5G-RG) and access gateway function (AGF) communicating over point to point protocol over Ethernet (PPPoE) that encapsulates control messages, where the 5G-RG or the AGF is a receiver of a message, the computing device comprising:
   a non-transitory machine readable medium having stored therein the fragmentation mechanism; and
   a processor coupled to the non-transitory machine readable medium, the processor to execute the fragmentation mechanism, the fragmentation mechanism to receive a first fragment and a second fragment of the message from a sender, determine whether the second fragment is an end fragment, the end fragment including metadata with a length, and a cyclic redundancy check, to check the length against the first fragment and second fragment, to validate the cyclic redundancy check, and to extract the message from the first fragment and second fragment, in response to the length, and the cyclic redundancy check being correct.

17. The computing device of claim 16, wherein the fragmentation mechanism is further to send an acknowledgement to the sender, in response to a message number, the length, and the cyclic redundancy check being correct.

18. The computing device of claim 16, wherein the fragmentation mechanism is further to send a negative acknowledgement or discarding the message, in response to the length not correlating with the first fragment and the second fragment.

19. The computing device of claim 16, wherein the fragmentation mechanism is further to send an acknowledgement and discarding a duplicate message, in response to a message number matching a prior message number.

20. The computing device of claim 16, wherein the message is an access stratum (AS) or non-access stratum (NAS) message.

\* \* \* \* \*